United States Patent

Tanaka et al.

[11] Patent Number: 5,177,964
[45] Date of Patent: Jan. 12, 1993

[54] HYDRAULIC DRIVE TRAVELING SYSTEM

[75] Inventors: Hideaki Tanaka, Tsuchiura; Toichi Hirata, Ushiku; Genroku Sugiyama; Hitoshi Kagiwada, both of Ibaraki; Tomohiko Yasuoka, Toride; Hiroshi Watanabe, Ushiku; Eiki Izumi; Hiroshi Onoue, both of Ibaraki, all of Japan

[73] Assignee: Hitachi Construction Machinery Co., Ltd., Tokyo, Japan

[21] Appl. No.: 499,418

[22] PCT Filed: Jan. 26, 1990

[86] PCT No.: PCT/JP90/00097

§ 371 Date: Jun. 25, 1990

§ 102(e) Date: Jun. 25, 1990

[87] PCT Pub. No.: WO90/08910

PCT Pub. Date: Sep. 8, 1990

[30] Foreign Application Priority Data

Jan. 27, 1989 [JP] Japan ................................. 1-18783
Oct. 25, 1989 [JP] Japan ................................ 1-277664

[51] Int. Cl.⁵ .............................................. F16D 31/02
[52] U.S. Cl. .............................................. 60/445; 60/487; 60/489; 60/490; 60/368; 60/452; 60/493
[58] Field of Search ............... 60/445, 487, 488, 489, 60/490, 368, 468, 427, 493, 452; 91/444, 448, 518

[56] References Cited

U.S. PATENT DOCUMENTS

| 3,175,354 | 3/1965 | Firth et al. | 60/489 X |
| 3,542,274 | 11/1970 | Miller | 60/368 X |
| 3,628,330 | 12/1971 | Miller | 60/368 |
| 4,295,539 | 10/1981 | Beck et al. | 60/490 X |
| 4,530,416 | 7/1985 | Kassai | 60/490 X |
| 4,672,811 | 6/1987 | Yoshida et al. | 60/445 X |
| 4,823,552 | 4/1989 | Ezell et al. | 60/445 X |
| 4,845,947 | 7/1989 | Persson et al. | 60/468 X |
| 4,967,557 | 11/1990 | Izumi et al. | 91/518 X |
| 5,042,251 | 8/1991 | Berthold | 60/490 X |
| 5,070,695 | 12/1991 | Metzner | 60/489 X |

FOREIGN PATENT DOCUMENTS

| 2846680 | 5/1980 | Fed. Rep. of Germany . |
| 3528096 | 2/1987 | Fed. Rep. of Germany . |
| 48-39494 | 11/1973 | Japan . |
| 59-20506 | 11/1984 | Japan . |
| 59-205062 | 11/1984 | Japan . |
| 63-54521 | 4/1988 | Japan . |

Primary Examiner—Edward K. Look
Assistant Examiner—Todd Mattingly
Attorney, Agent, or Firm—Fay, Sharpe, Beall, Fagan, Minnich & McKee

[57] ABSTRACT

A hydraulic drive traveling system has a pressure compensated low control valve connected between a hydraulic pump and a variable displacement type hydraulic motor for controlling a flow rate of the hydraulic fluid supplied to the motor. The flow rate is controlled in accordance with the delivery pressure of the pump and demanded traveling speed of the motor. When the delivery pressure of the pump is at a high level, the motor is shifted to a first capacity. When the delivery pressure of the pump is low, the motor is shifted to either the second capacity or the first capacity depending upon the demanded traveling speed.

21 Claims, 29 Drawing Sheets

HYDRAULIC DRIVE TRAVELING SYSTEM

TECHNICAL FIELD

The present invention relates to a hydraulic drive traveling system for construction vehicles such as wheel loaders or power excavators, and more particularly to a hydraulic drive traveling system which employs a hydraulic pump of variable displacement type as a drive source for traveling and automatically varies the capacity of the hydraulic motor to perform two-speed control during the traveling.

BACKGROUND ART

In hydraulic drive traveling systems for construction vehicles such as wheel loaders or power excavators, a hydraulic pump of variable displacement type is used as a drive source for traveling, and the capacity of the hydraulic motor is varied at two speeds dependent on changes in the traveling load produced due to a slope of the road surface, the nature of the ground, etc. so that two-speed control is performed while traveling. In order to eliminate trouble or intricacy imposed on an operator for varying the capacity, one of such hydraulic drive traveling systems as disclosed in JP.U. 63-54521 is designed to vary the capacity automatically.

More specifically, the disclosed conventional hydraulic drive traveling system comprises an engine, a hydraulic pump driven by the engine, a traveling hydraulic motor of variable displacement type driven by the hydraulic pump, a pressure sensor for detecting a delivery pressure of the hydraulic pump, and motor control means for comparing the pump delivery pressure detected by the pressure sensor with a setting value, and changing a swash plate tilting angle of the hydraulic motor between a large tilting (large capacity) and a small tilting (small capacity) from one to the other dependent on the compared result.

During operation under the high traveling load, e.g., while ascending a sloped road, the delivery pressure of the hydraulic pump is increased and the pressure sensor detects the increased pump delivery pressure. When the detected pump delivery pressure exceeds a first setting value, the motor control means shifts the swash plate tilting angle of the hydraulic motor toward the large tilting side. The hydraulic motor is thereby set to a low-speed, large-torque mode for providing traction force enough to ascend the sloped road. When coming into operation under the low traveling load, e.g., traveling on a flat road, the delivery pressure of the hydraulic pump is reduced and the pressure sensor detects the reduced pump delivery pressure. If the detected pump delivery pressure falls below a second setting value, the motor control means shifts the swash plate tilting angle of the hydraulic motor toward the small tilting side. The hydraulic motor is thereby set to a high-speed, low-torque mode for permitting the traveling at a high speed.

Thus, in the conventional system, the delivery pressure of the hydraulic pump is detected and the detected pump delivery pressure is compared with the first and second setting values. Dependent on a result of the comparison, the capacity of the traveling hydraulic motor is carried out to automatically perform two-speed control of the traveling. In the conventional system, however, when traveling on a flat road under the low traveling load with fine control operation, the delivery pressure of the hydraulic pump is not increased so that the hydraulic motor is always shifted toward the small tilting side and hence controlled in the high-speed, low-torque mode. This creates a problem of difficulty in achieving a wide speed range from low speeds to high speeds in a usual traveling condition.

An object of the present invention is to provide a hydraulic drive traveling system which can take a wide speed range from low speeds to high speeds even in a condition under the small traveling load.

DISCLOSURE OF THE INVENTION

To achieve the above object, the present invention provides a hydraulic drive traveling system comprising a hydraulic pump, at least one hydraulic motor of variable displacement type driven by a hydraulic fluid delivered from said hydraulic pump, a pressure compensated flow control valve connected between said hydraulic pump and said hydraulic motor for controlling a flow rate of the hydraulic fluid supplied to said hydraulic motor dependent on an operation amount of control means, and motor control means for shifting said hydraulic motor between a first capacity and a second capacity smaller than the first capacity, wherein said motor control means includes first means for detecting a value associated with a traveling speed demanded of said hydraulic motor, and second means for controlling said hydraulic motor between the first capacity and the second capacity by using said value.

Preferably, the hydraulic drive traveling system further comprises pump control means for controlling a delivery capacity of the hydraulic pump dependent on the operation amount of the control means, and the first means detects a value associated with the delivery rate of the hydraulic pump as the said value associated with the traveling speed demanded. A delivery capacity of the hydraulic pump is preferably detected as the said value associated with the delivery rate of said hydraulic pump.

Preferably, the pump control means includes means for calculating a target delivery capacity to hold constant a differential pressure between the delivery pressure of the hydraulic pump and the load pressure of the hydraulic pump, and means for controlling the delivery capacity of the hydraulic pump to be coincident with the target delivery capacity, and the first means detects the target delivery capacity as the delivery capacity of the hydraulic pump.

The first means may detect an actual delivery capacity of the hydraulic pump as the delivery capacity of the hydraulic pump.

Preferably, the second means includes means for detecting a delivery pressure of the hydraulic pump, means for calculating a shift decision value for the capacity of hydraulic motor from the said value associated with the traveling speed demanded, and means for comparing the delivery pressure of the hydraulic pump with the shift decision value, and controlling the hydraulic motor to have the first capacity when the delivery pressure is larger than the shift decision value, and to have the second capacity when the delivery pressure is smaller than the shift decision value. The said means for calculating the shift decision value preferably sets the relationship between the said value associated with the traveling speed demanded and the shift decision value such that the shift decision value is small in a range where the said value associated with the traveling speed demanded is small, and becomes larger as the said value associated with the traveling speed demanded is increased.

The second means may includes means for detecting a delivery pressure of the hydraulic pump, means for calculating a shift decision value for the capacity of the hydraulic motor from the delivery pressure, and means for comparing the said value associated with the traveling speed demanded with the shift decision value, and controlling the hydraulic motor to have the first capacity when the said value associated with the traveling speed demanded is smaller than the shift decision value, and to have the second capacity when the said value associated with the traveling speed demanded is larger than the shift decision value. The said means for calculating the shift decision value preferably sets the relationship between the delivery pressure and the shift decision value such that the shift decision value is small in a range where the delivery pressure is small, and becomes larger as the delivery pressure is increased.

Further, the second means may includes means for setting a shift decision value for the capacity of the hydraulic motor in advance, and means for comparing the said value associated with the traveling speed demanded with the shift decision value, and controlling the hydraulic motor to have the first capacity when the said value associated with the traveling speed demanded is smaller than the shift decision value, and to have the second capacity when the said value associated with the traveling speed demanded is larger than the shift decision value.

Preferably, the second means further includes means for delaying shift in the capacity of the hydraulic motor by a certain period of time when the result of comparison with the shift decision value is changed. As an alternative, the second means may further include means for keeping the motor capacity shifted until elapse of a certain period of time after shifting the capacity of the hydraulic motor, even when the result of comparison with the shift decision value is changed.

Further, the second means may include means for detecting a delivery pressure of the hydraulic pump, means for calculating a first shift decision value and a second shift decision value larger than the first shift decision value from the said value associated with the traveling speed demanded, and means for comparing the delivery pressure of the hydraulic pump with the first and second shift decision values, and controlling the hydraulic motor to have the first capacity when the delivery pressure is larger than the second shift decision value, to have the second capacity when the delivery pressure is smaller than the first shift decision value, and to maintain the motor capacity at that time when the delivery pressure is between the first shift decision value and the second shift decision value.

Furthermore, the second means may include means for detecting a delivery pressure of the hydraulic pump, means for calculating a first shift decision value and a second shift decision value larger than the first shift decision value from the delivery pressure, and means for comparing the said value associated with the traveling speed demanded with the first and second shift decision values, and controlling the hydraulic motor to have the first capacity when the said value associated with the traveling speed demanded is smaller than the first shift decision value, to have the second capacity when the said value associated with the traveling speed demanded is larger than the second shift decision value, and to maintain the motor capacity at that time when the said value associated with the traveling speed demanded is between the first shift decision value and the second shift decision value.

In addition, the second means may include means for setting a first shift decision value and a second shift decision value larger than the first shift decision value in advance, and means for comparing the said value associated with the traveling speed demanded with the first and second shift decision values, and controlling the hydraulic motor to have the first capacity when the said value associated with the traveling speed demanded is smaller than the first shift decision value, to have the second capacity when the said value associated with the traveling speed demanded is larger than the second shift decision value, and to maintain the motor capacity at that time when the said value associated with the traveling speed demanded is between the first shift decision value and the second shift decision value.

In the case of using preset values as the shift decision values, preferably, the hydraulic drive traveling system further comprises pump control means for controlling a delivery rate of the hydraulic pump such that a maximum value of the delivery rate of the hydraulic pump is reduced with a rise in the delivery pressure of the hydraulic pump, when the delivery pressure exceeds a predetermined value, and the first means detects a value associated with the delivery rate of the hydraulic pump as the said value associated with the traveling speed demanded.

BEST MODE FOR CARRYING OUT THE INVENTION

Hereinafter, several preferred embodiments of the present invention will be described with reference to the accompanying drawings.

FIRST EMBODIMENT

To begin with, a first embodiment of the present invention will be explained by referring to FIGS. 1-9.

Figure 1:
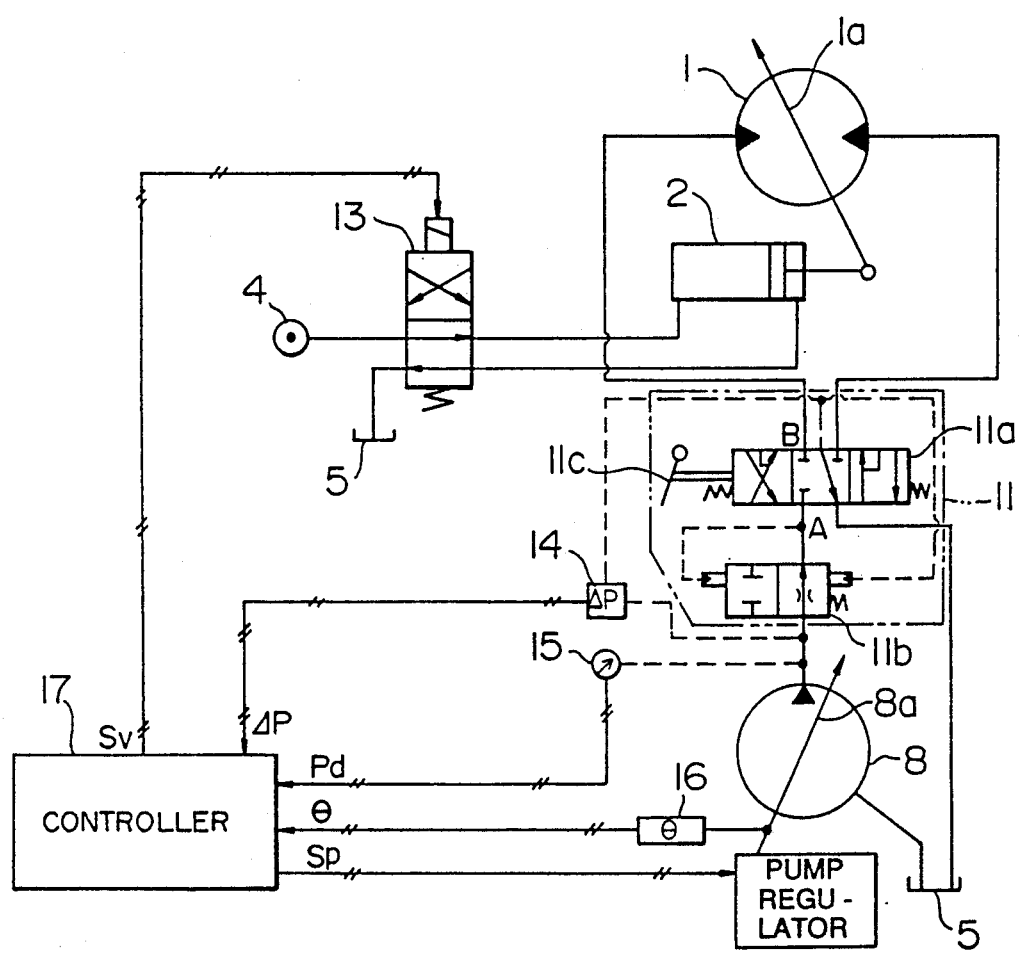
FIG. 1 is a schematic diagram of a hydraulic drive traveling system according to one embodiment of the present invention.

In FIG. 1, designated by reference numeral 1 is a hydraulic motor of variable displacement type which is used in a traveling system and has its capacity variable through a capacity varying mechanism 1a (referred to as a swash plate hereinafter) driven by a cylinder 2. The cylinder 2 is selectively switched or shifted in its connection with a pilot hydraulic source 4 and a tank 5 by a solenoid select valve 13 for driving the capacity varying mechanism 1a toward the large and small tilting sides, respectively. 8 is a hydraulic pump of variable displacement type which supplies a hydraulic fluid to the hydraulic motor 1 and has its delivery capacity variable through a capacity varying mechanism 8a (referred to as a swash plate hereinafter) driven by a pump regulator 12.

The flow rate of the hydraulic fluid supplied to the hydraulic motor 1 from the hydraulic pump 8 is controlled by a pressure compensated flow control valve 11. The pressure compensated flow control valve 11 comprises a flow control valve 11a and a pressure compensating valve 11b combined with each other. The flow control valve 11a is operated by a control lever 11c to provide an opening degree dependent on the operation amount. For the pressure compensated flow control valve 11, the control compensating valve 11b makes control such that the pressure difference between a pump side port A and an actuator side port B of the flow control valve 11a is kept constant, and also that the hydraulic fluid is always caused to flow at a flow rate dependent on an opening degree of the flow control valve 11a in spite of changes in a load pressure of the hydraulic motor 1.

The hydraulic circuit thus arranged includes sensors such as a differential pressure sensor 14, a pressure sensor 15 and a tilting angle sensor 16. The differential pressure sensor 14 detects a differential pressure between the pressure at a delivery port of the hydraulic pump 8, i.e., the delivery pressure of the hydraulic pump 8, and the pressure at the actuator side port of the flow control valve 11a, i.e., the load pressure of the hydraulic motor 1, and converts the detected differential pressure to an electric signal for outputting it to a controller 17. The pressure sensor 15 detects a pressure at the delivery port of the hydraulic pump 8, and converts the detected pressure to an electric signal for outputting it to the controller 17. The tilting angle sensor 16, comprising a potentiometer or the like, detects a position of the swash plate 8a of the hydraulic pump 8, i.e., the delivery capacity of the hydraulic pump 8, and converts the detected result to an electric signal for outputting it to the controller 17.

The controller 17 receives the electric signals from the differential pressure sensor 14, the pressure sensor 15 and the tilting angle sensor 16, performs arithmetic control operation described later, and outputs control signals Sp, Sv to the pump regulator 12 and the solenoid select valve 13, respectively.

Figure 2:
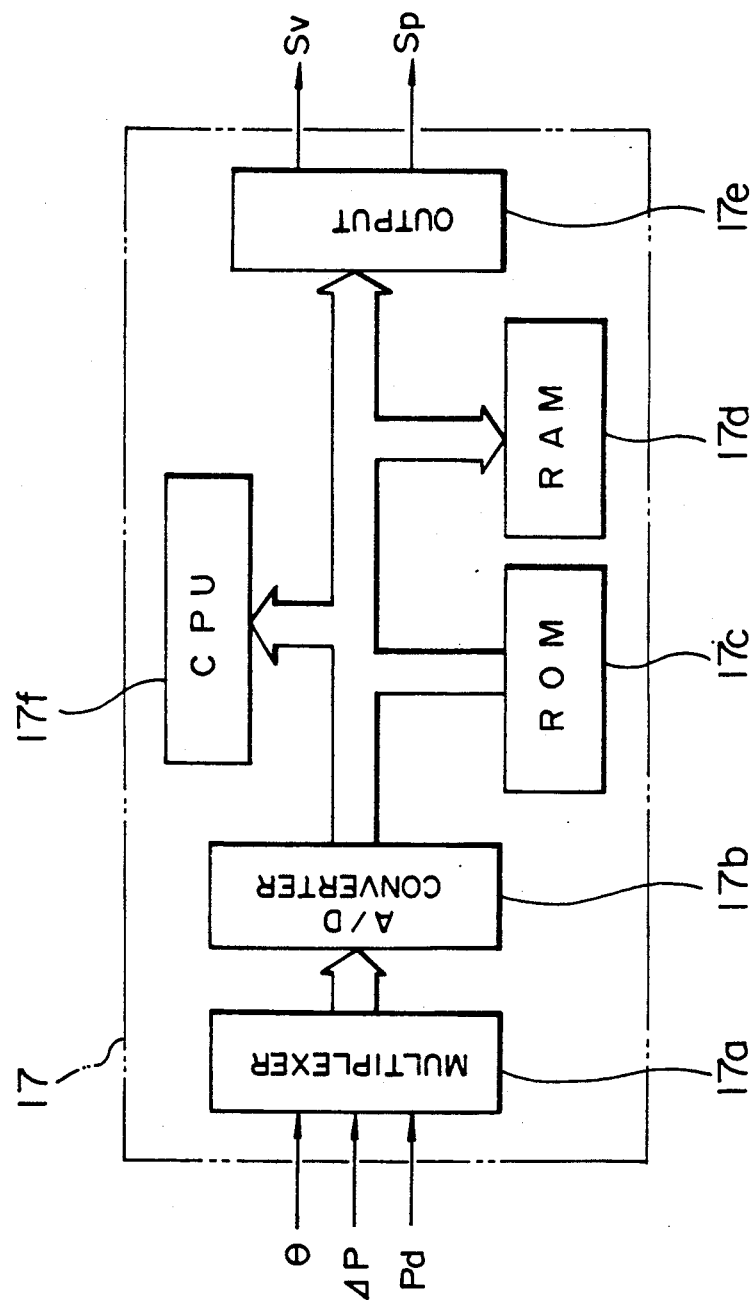
FIG. 2 is a block diagram showing the internal configuration of a controller.

FIG. 2 shows the internal configuration of the controller 17. The controller 17 comprises a microcomputer as the center, including a multiplexer 17a, an A/D converter 17b, a ROM memory 17c, a RAM memory 17d, an output interface 17e, and a CPU 17f. The multiplexer 17a outputs a signal $\Delta P$ of the differential pressure sensor 14, a signal Pd of the pressure sensor 15, and a signal $\theta$ of the tilting angle sensor 16 to the A/D converter 17b one by one in a switched manner. The A/D converter 17b converts the signal from the multiplexer 17a to a digital signal. The ROM memory 17c stores the control procedure for the controller 17, and the RAM memory 17d temporarily stores data after A/D conversion or data under arithmetic operation. The output interface 17e outputs the control signals to the pump regulator 12 and the solenoid select valve 13. The CPU 17f controls the entire controller 17 in accordance with the control procedure stored in the ROM memory 17c.

Figure 3:
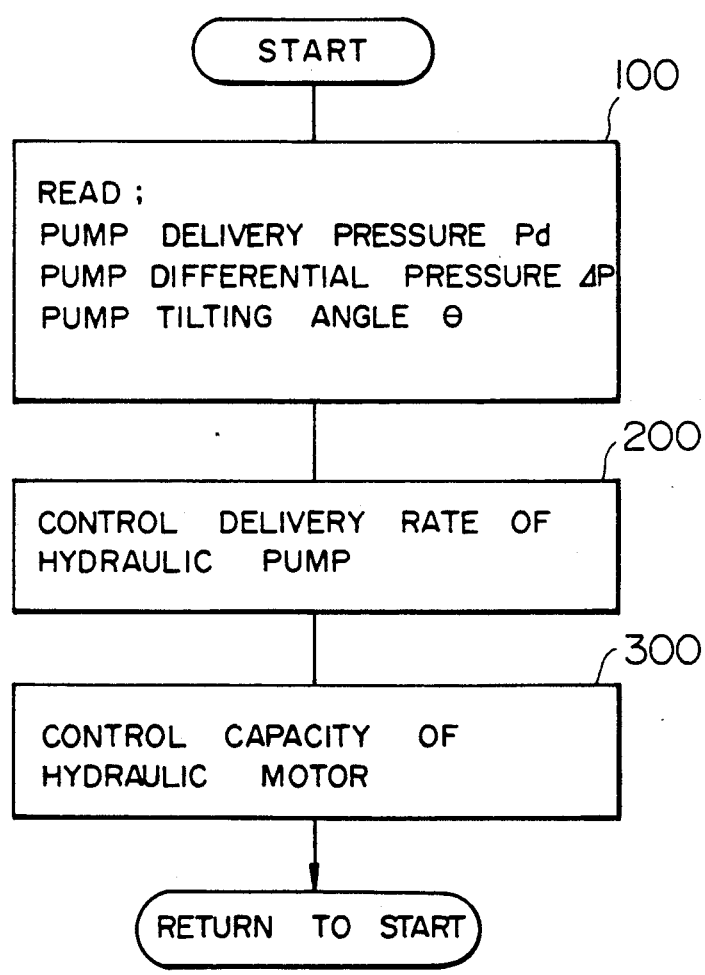
FIG. 3 is a flowchart showing the control procedure stored in a ROM memory of the controller.

FIG. 3 shows a flowchart of the control procedure stored in the ROM memory 17c. The control procedure will now be described by referring to FIG. 3. First, in step 100, the delivery pressure Pd, the differential pressure $\Delta P$, and the tilting angle $\theta$ of the hydraulic pump 8 are input from the A/D converter 17b and stored in the RAM memory 17d, while switching the multiplexer 17a. Then, step 200 performs control of the pump tilting.

Figure 4:
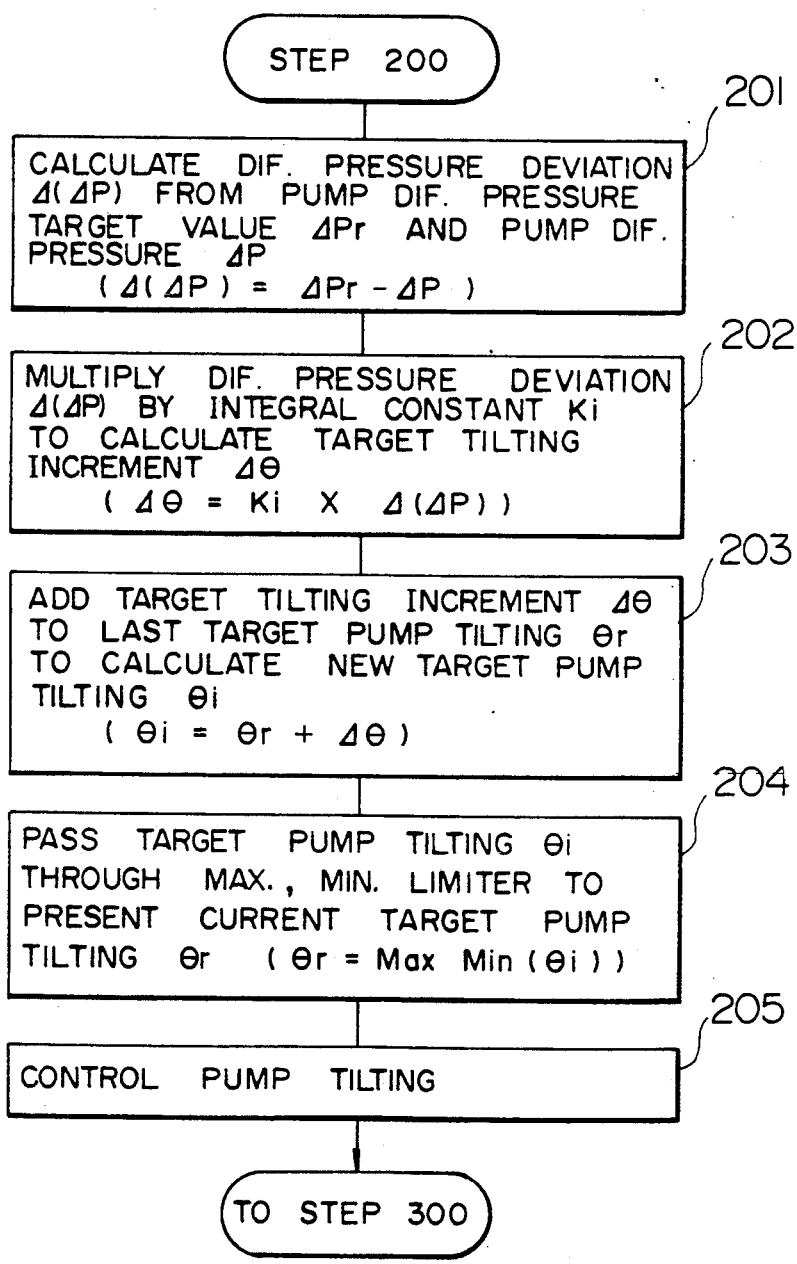
FIG. 4 is a flowchart showing details of capacity control for a hydraulic pump.

FIG. 4 shows a detailed flowchart of step 200. First, in FIG. 4, step 201 calculates a deviation $\Delta (\Delta P)$ between a pump differential pressure target value $\Delta Pr$ and the differential pressure ΔP. In next step 202, the differential pressure deviation Δ (ΔP) is multiplied by an integral constant Ki to calculate a target tilting increment Δθ. Next step 203 adds the target tilting increment Δθ to a target pump tilting θi calculated last time for calculating a new target pump tilting θi.

Then, in step 204, the target pump tilting θi is passed through a maximum and minimum limiter to be matched with a range of the actual tilting, thereby presenting a current target pump tilting θr. Next step 205 controls the pump tilting to be coincident with the target tilting.

Figure 5:
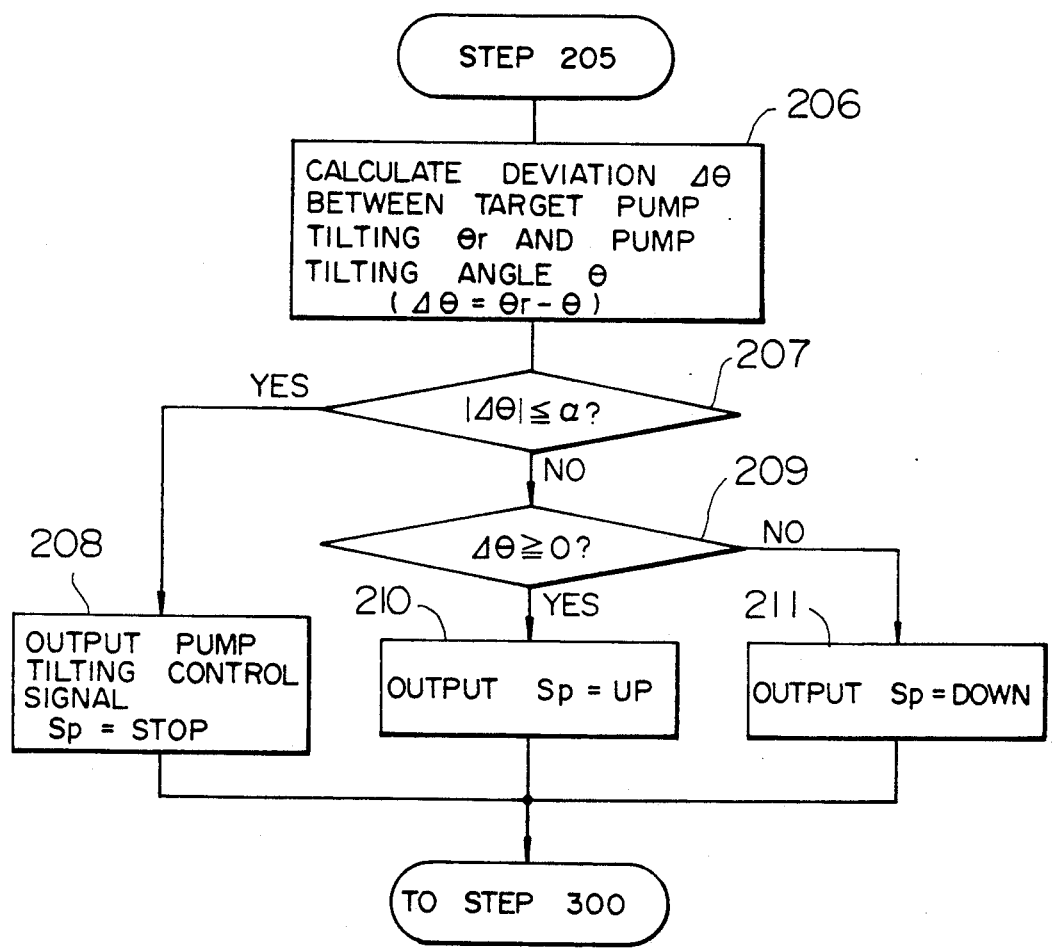
FIG. 5 is a flowchart showing details of drive control for a pump tilting.

FIG. 5 shows a detailed flowchart of step 200. First, step 206 calculates a tilting deviation Δθ between the target pump tilting θr and the pump tilting θ applied in step 100. Then, step 207 determines whether or not an absolute value of the tilting deviation Δθ falls within a dead zone α. The dead zone α is provided to prevent useless control output from being produced with the small tilting deviation. If the tilting deviation Δθ is determined to be within the dead zone, the process goes to step 208. Step 208 outputs a signal for setting the control signal Sp for the pump regulator 12 to STOP so that the swash plate 8a of the hydraulic pump 8 is stopped at the current position. If the tilting deviation Δθ is determined to be beyond the dead zone α in step 207, the process goes to step 209. In step 209, it is determined whether the sign of the tilting deviation Δθ is positive or negative. If the tilting deviation Δθ is positive, the process goes to step 210. Step 210 outputs a signal for setting the control signal Sp for the pump regulator 12 to UP so that the swash plate 8a is driven toward the large tilting side. If the tilting deviation Δθ is determined to be negative in step 209, the process goes to step 211. Step 211 outputs a signal for setting the control signal Sp for the pump regulator 12 to DOWN so that the swash plate 8a is driven toward the small tilting side. After completion of steps 208, 210 and 211, the process goes to next step 300.

Figure 6:
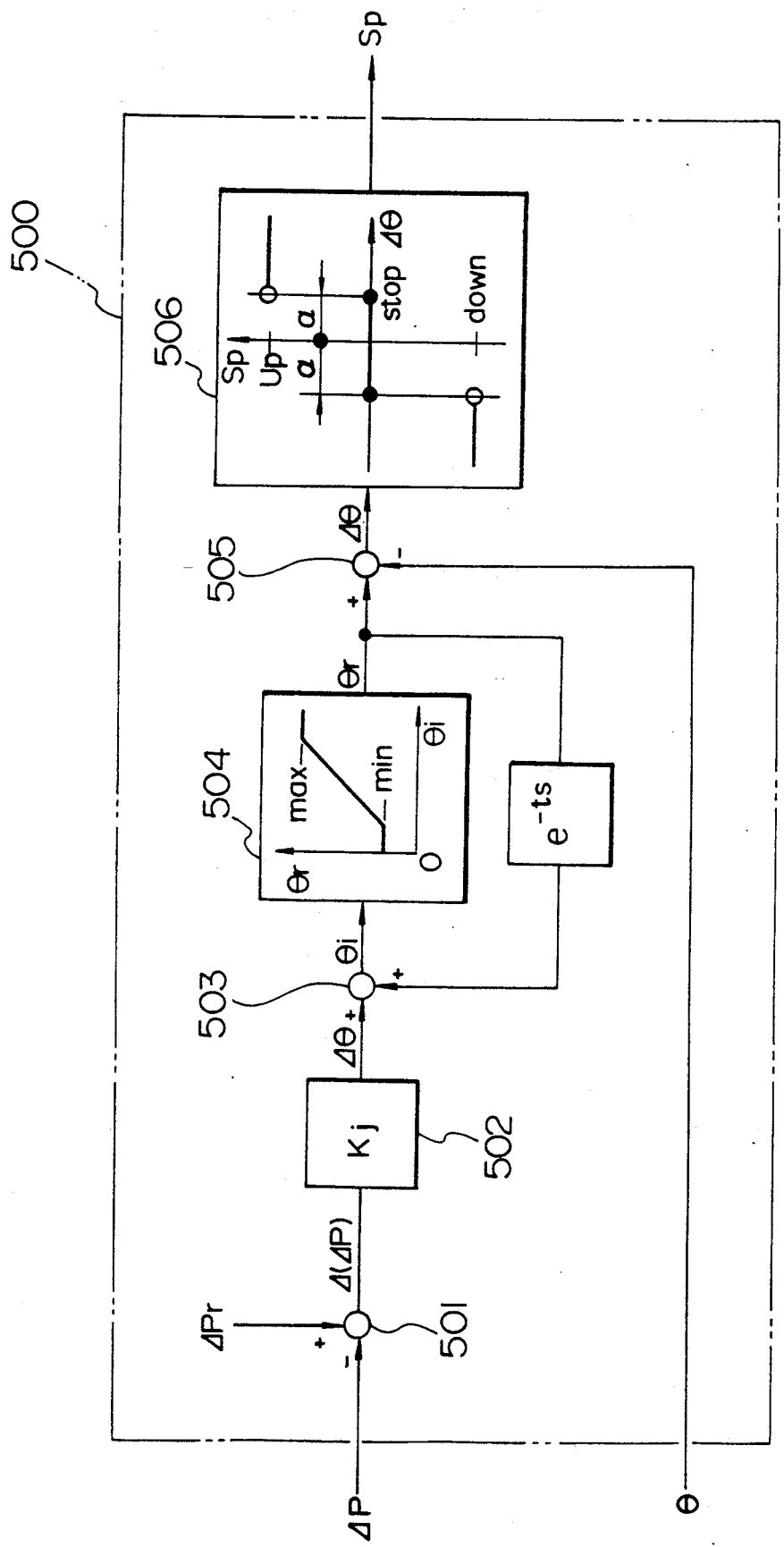
FIG. 6 is a block diagram showing the flowcharts of FIGS. 4 and 5 in the form of a control block.

FIG. 6 shows the flowcharts of FIGS. 4 and 5 in the form of a control block 500. In FIG. 6, a block 501 corresponds to above step 201, a block 502 to step 202, block 503 to step 203, a block 504 to step 204, a block 505 to step 206, and a block 506 to steps 207-211, respectively.

Thus, the delivery rate of the hydraulic pump 8 is controlled so that the delivery pressure Pd becomes higher by the differential pressure target value ΔPr than the load pressure of the hydraulic motor 1. The hydraulic pump 8 is thereby controlled to the delivery capacity demanded by the pressure compensated flow control valve 11.

Note that although integral type control is utilized in the foregoing pump control, the present invention is not limited to this type control and may also be implemented using any of proportional, proportional and integral, and other types of control.

Figure 7:
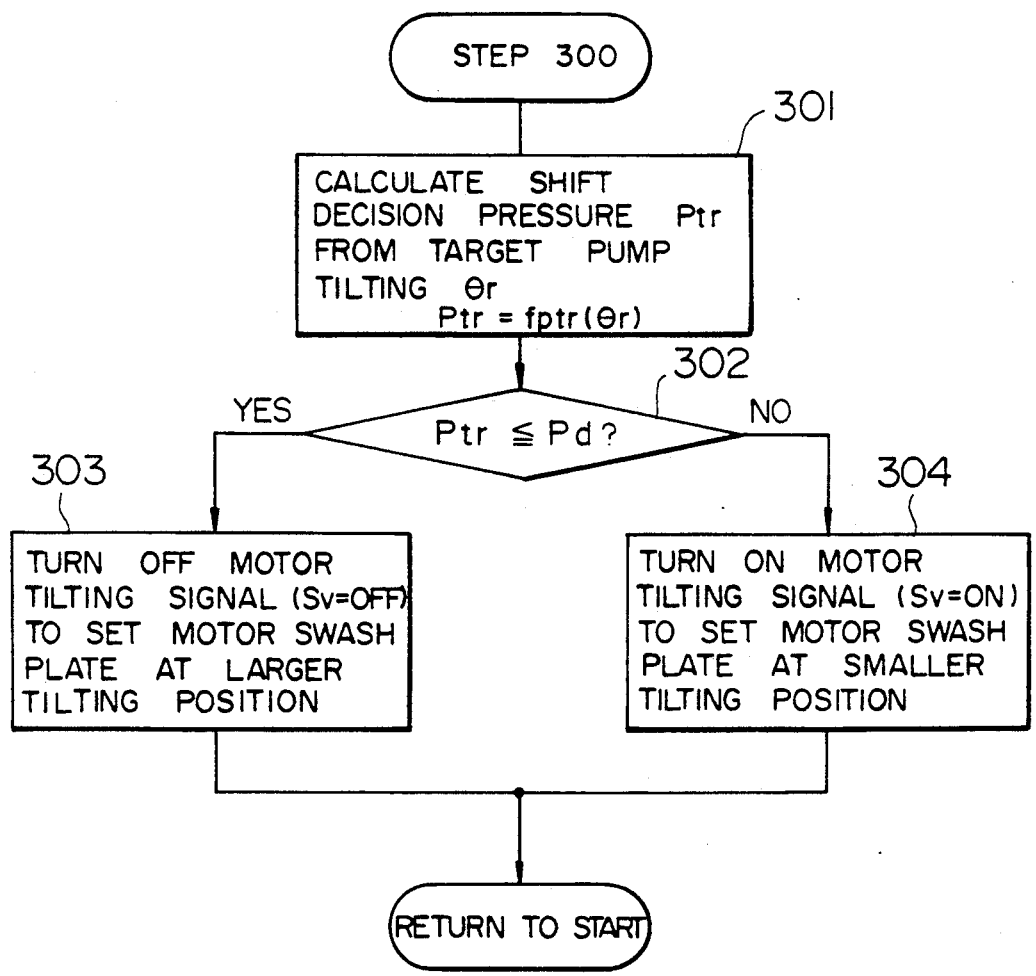
FIG. 7 is a flowchart showing details of capacity control of a hydraulic motor.

Upon completion of step 200, the process goes to step 300 for controlling the capacity of the hydraulic motor. FIG. 7 shows a detailed flowchart of the step 300.

First, in step 301, the shift decision pressure Ptr is calculated from the target pump tilting θr. Here, the relationship of Ptr=fptr(θ) between θr and Ptr has such a characteristic that Ptr=0 holds in a range where θr is small and, as θr increases beyond θro, Ptr becomes larger proportionally, as indicated by a solid line in FIG. 8.

Then, step 302 compares the shift decision pressure Ptr with the delivery pressure Pd of the hydraulic pump to determine which one is larger.

If Pd≧Ptr holds, the process goes to step 303 where the motor tilting signal Sv is turned off to set the swash plate 1a of the hydraulic motor 1 at a larger tilting position for bringing the hydraulic motor into a large-torque, low-speed mode.

If Pd<Ptr is determined in step 302, the process goes to step 304 where the motor tilting signal Sv is turned on to set the swash plate 1a of the hydraulic motor 1 at a smaller tilting position for bringing the hydraulic motor into a small-torque, high-speed mode.

Upon completion of above step 300, the process returns to the start for executing step 100 again. Steps 100-300 are recirculated at all times for continuous control.

Figure 9:
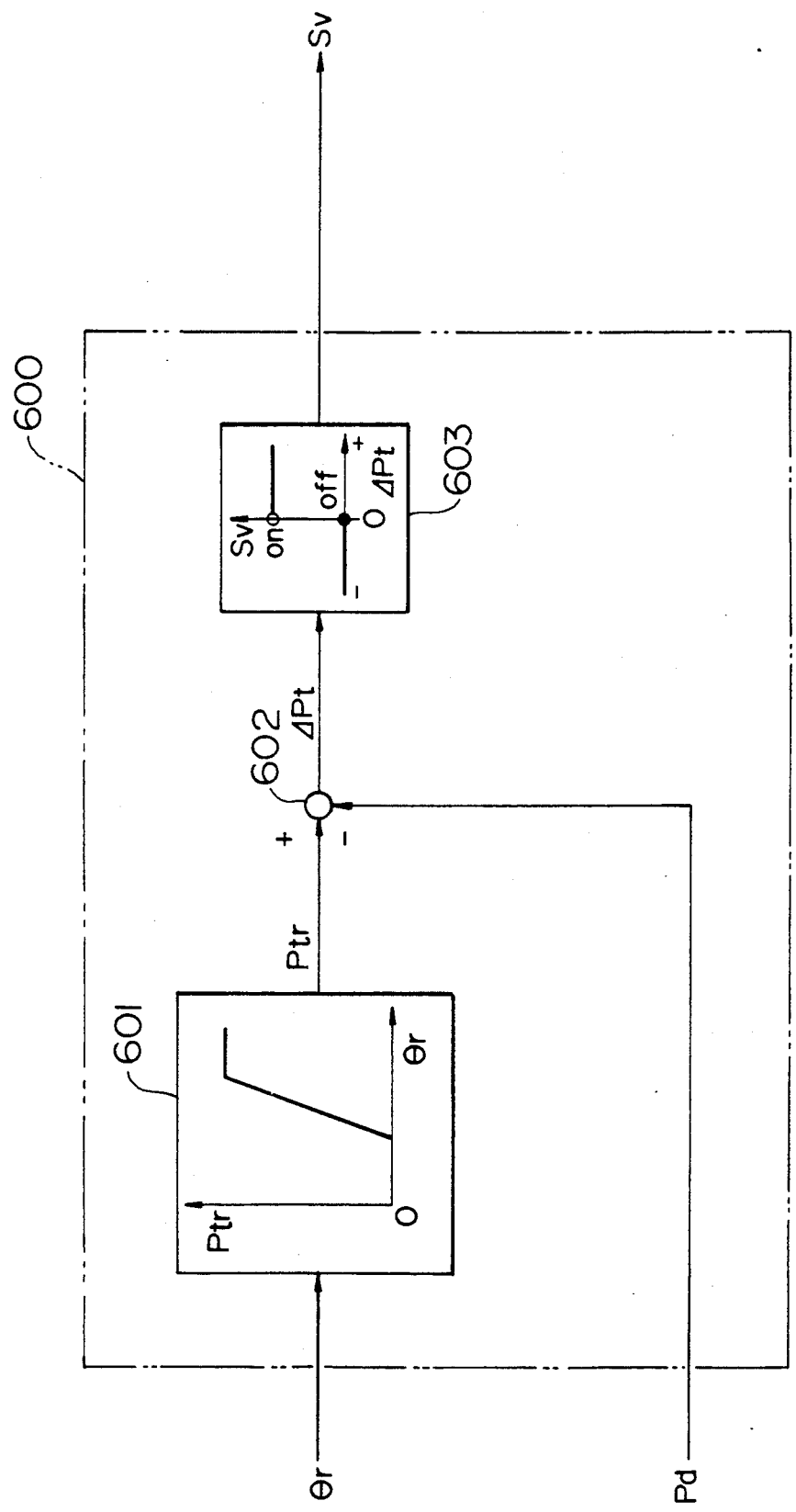
FIG. 9 is a block diagram showing the flowchart of FIG. 7 in the form of a control block.

The foregoing sequence of step 300 is shown in FIG. 9 in the form of a control block 600. In FIG. 9, a block 601 corresponds to step 301 in FIG. 7 and blocks 602, 603 correspond to steps 302-304 therein, respectively.

Here, characteristics of θr and Ptr shown in FIG. 8 or the block 601 of FIG. 9 are set as follows by way of example.

Figure 8:
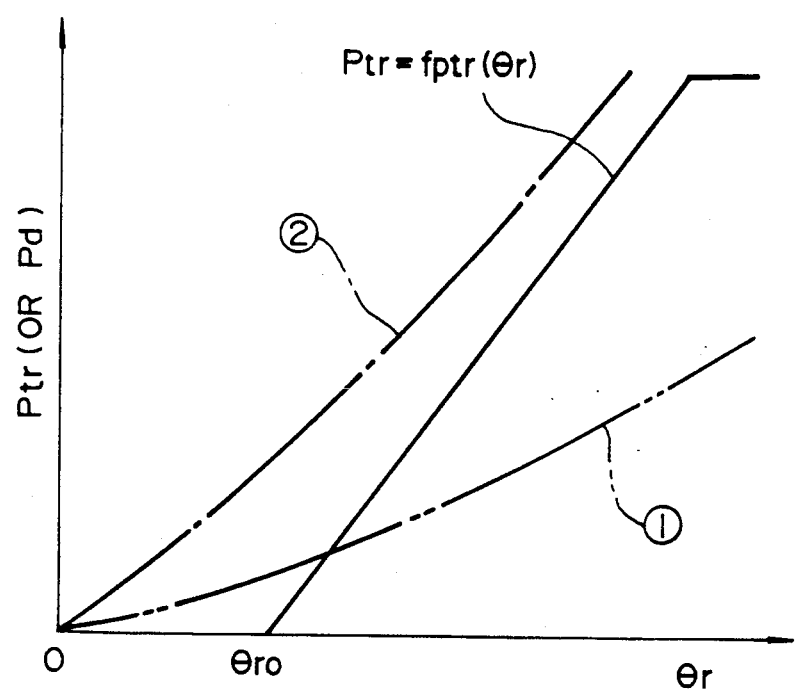
FIG. 8 is a graph showing the relationship between a target pump tilting $\theta r$ and a shift decision pressure Ptr.

First, the relationship between the target pump tilting θr and the delivery pressure Pd of the hydraulic pump 8 to be established when traveling on a flat road with the tilting angle of the hydraulic motor 1 held fixed to the small tilting side, i.e., the small torque side, is plotted as a curve ① shown in FIG. 8.

Then, the relationship between the target pump tilting θr and the delivery pressure Pd to be established when ascending a sloped road with the motor tilting angle held fixed to the large tilting side, i.e., the large torque side, in an attempt to always increase climbing force with the large motor tilting angle plotted as a curve ②.

In the case of the curve ①, it is desired to drive the hydraulic motor 1 at a low speed when the target pump tilting θr is small and the pump tilting θ is also small, and at a high speed when θr is large and θ is also large. In the case of the curve ②, it is desired to set the hydraulic pump on the low speed side at all times. Therefore, the θr - Ptr curve is determined such that it is positioned below the curve ① in a range of small θr, intersects the curve ① at θr from which the motor is to be controlled at a high speed, and thereafter is positioned below the curve ② while progressively approaching thereto.

With the characteristic set as mentioned above, supposing that the target pump tilting θr and the pump delivery pressure Pd are changed along the curve ① while traveling on a flat road, the hydraulic motor is always operated with the large motor tilting, i.e., in the low-speed mode, because of Ptr≦Pd in a region where θr is smaller than the value of θr at which the curve ① intersects the characteristic line of θr−Ptr, and is always operated with the small motor tilting, i.e., in the high-speed mode, because of Ptr>Pd in a region where θr is larger than the value of θr at the intersect. Thus, a wide speed range can be provided by selectively using both the low-speed mode and the high-speed mode. Furthermore, when ascending a sloped road of which slope requires to produce the pump delivery pressure given by the curve ②, the hydraulic motor is always operated with the large motor tilting, i.e., in the large-torque mode, because of Ptr≦Pd, making it possible to produce the increased climbing force.

In this embodiment thus arranged, the hydraulic pump 8 is controlled by the control block 500 to have the delivery capacity demanded from the pressure compensated flow control valve 11, and the target pump tilting $\theta r$ at that time corresponds to a traveling speed demanded from the flow control valve 11. More specifically, when an operator operates the control lever 11c in a small stroke, aiming at traveling at a low speed, the target pump tilting $\theta r$ becomes also small, and when he operates the control lever 11c in a large stroke, aiming at traveling at a high speed, the target pump tilting $\theta r$ becomes also large. At this time, Ptr is calculated in the control block 600 shown in FIG. 9 from $\theta r$ and the characteristic of the shift decision pressure Ptr, thereby controlling the motor tilting as mentioned above.

Therefore, when traveling at a low speed is demanded, the shift decision pressure Ptr becomes so small that Ptr≦Pd holds even with the lower load pressure while traveling on a flat road. The hydraulic motor 1 can be hence shifted toward the large capacity to be operated in the low-speed mode for improvement in operability with fine control. Even when the load pressure is increased upon coming into a sloped road to ascend, the relationship of Ptr≦Pd is not changed, with the result that the hydraulic motor 1 remains shifted toward the large capacity and is driven in the low-speed, large-torque mode.

Meanwhile, when traveling at a high speed is demanded, the shift decision pressure Ptr becomes so large that Ptr>Pd holds at the lower load pressure while traveling on a flat road. The hydraulic motor can be hence shifted toward the small capacity to be operated in the high-speed mode. In other words, even when the load pressure (pump delivery pressure) is increased, the hydraulic motor will not easily be shifted to the low-speed mode. When the load pressure is further increased so as to enter the relationship of Ptr≦Pd upon coming into a sloped road to ascend, the hydraulic motor 1 is automatically shifted to the low-speed, large-torque mode.

According to this embodiment, as described above, since the capacity of the hydraulic motor is shifted dependent on a traveling speed demanded while traveling on a flat road, it is possible to take a wide speed range from low speeds to high speeds even under condition of the small traveling load, and to improve operability in traveling with fine control.

SECOND EMBODIMENT

Figure 10:
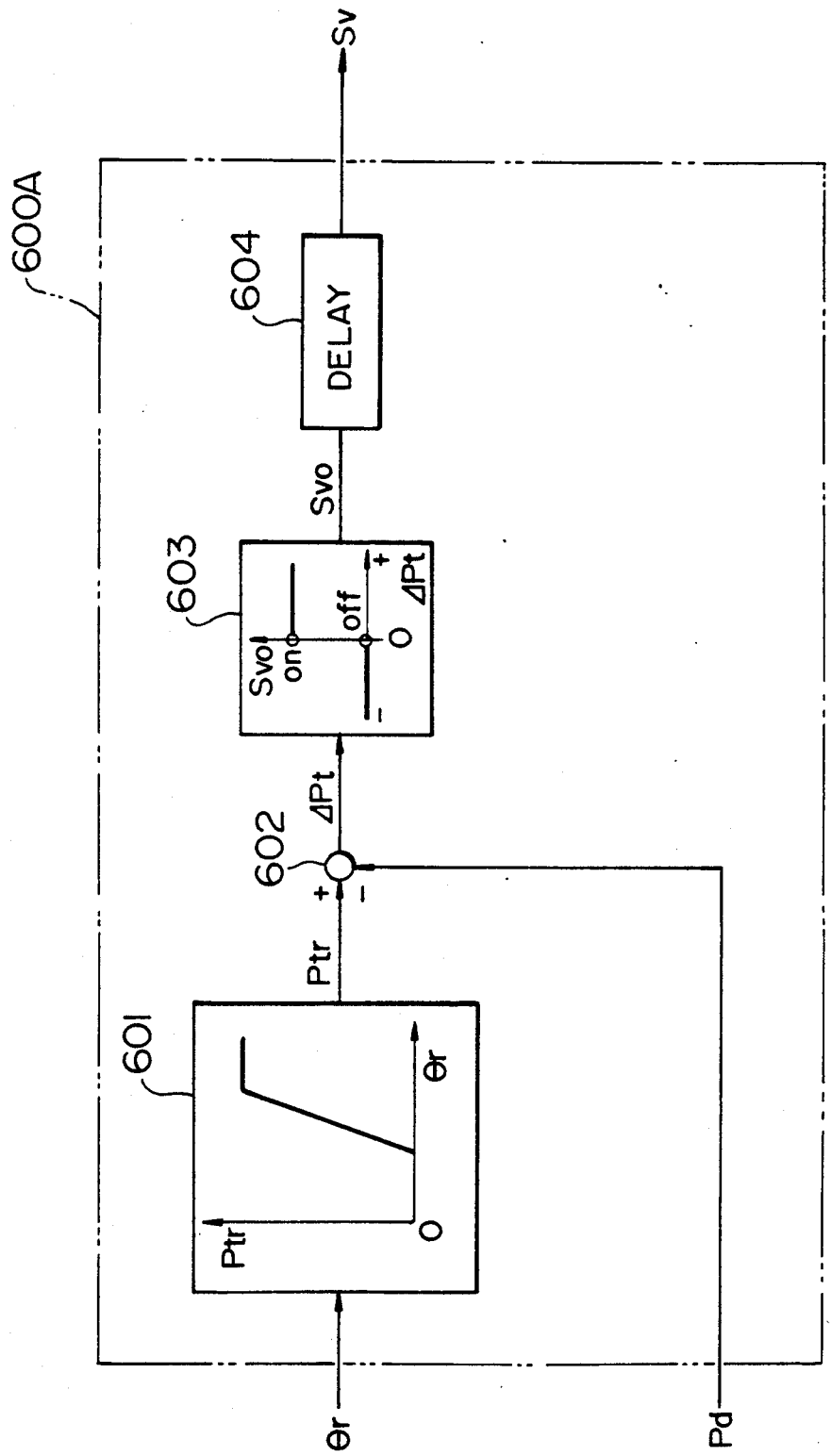
FIG. 10 is a block diagram showing capacity control of the hydraulic motor, in the form of control blocks, according to a second embodiment of the present invention.

A second embodiment of the present invention will be described below with reference to FIG. 10. In FIG. 10, a control block 600A of this embodiment is substituted for the control block 600 of the first embodiment shown in FIGS. 3-9, and the remaining part is employed as it is.

In the control block 600A of FIG. 10, a block 604 providing a delay or dead time is added. This delay time is provided upon shifting in the capacity of the hydraulic motor 1, such that when the delivery pressure Pd of the hydraulic pump 1 and the shift decision pressure Ptr are changed in their levels, causing a motor tilting primary signal Svo to be turned from an on-state to an off-state or vice versa in a block 603, the motor tilting signal Sv corresponding to Svo is output after the elapse of a certain time. Then, during the certain time, the subsequent change in the motor tilting primary signal Svo is made invalid. Stated otherwise, following a change in the relationship between Pd and Ptr, the capacity of the hydraulic motor 1 is shifted when Pd, i.e., the load pressure, has become stabilized after elapse of the delay time. This makes the system insensitive to temporary fluctuations in pressure as produced when switching the capacity of the hydraulic motor 1, and less susceptible to hunting.

THIRD EMBODIMENT

Figure 11:
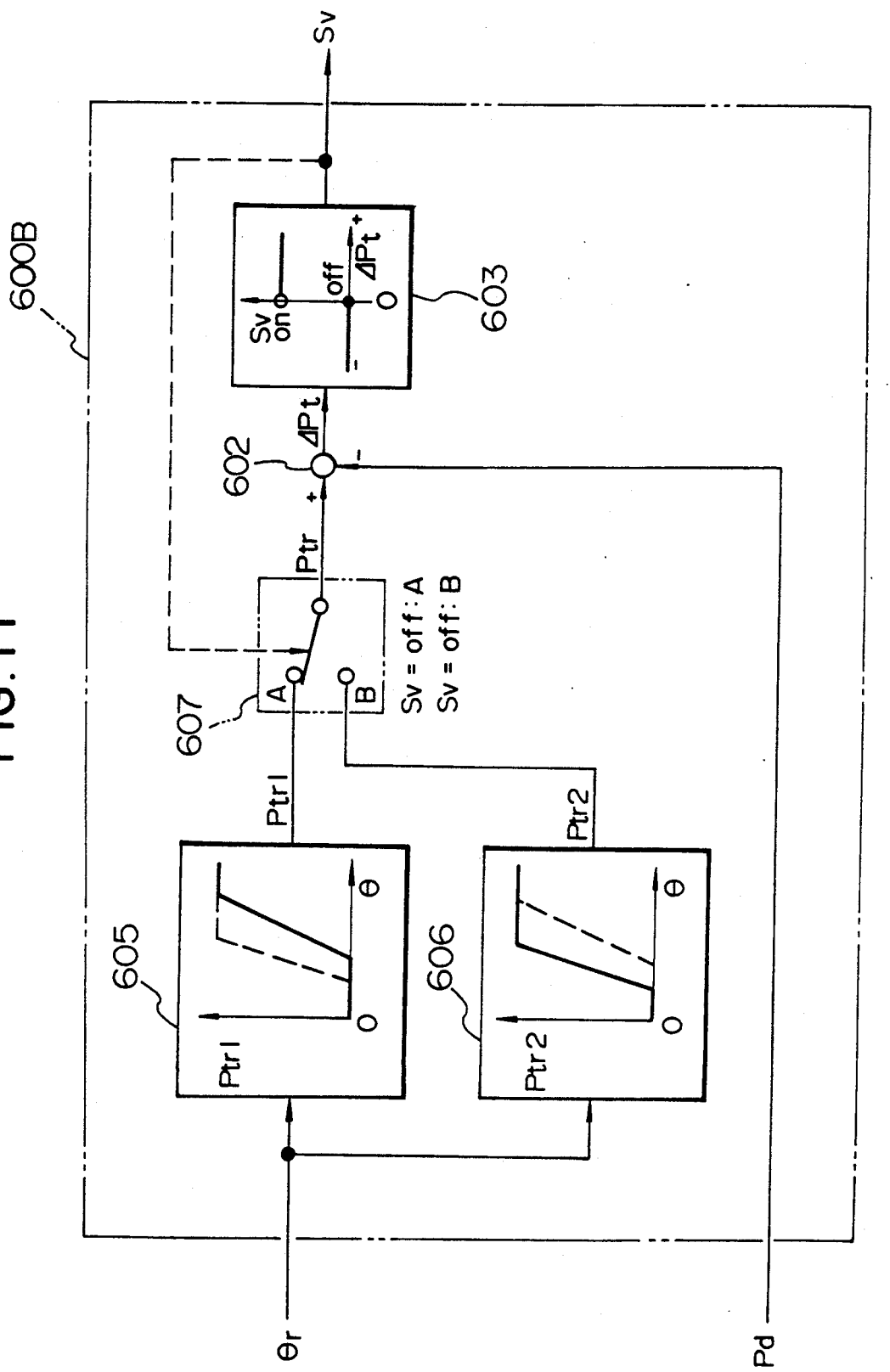
FIG. 11 is a block diagram showing capacity control of the hydraulic motor, in the form of a control block, according to a third embodiment of the present invention.

A third embodiment of the present invention will be described below with reference to FIG. 11. In FIG. 11, a control block 600B of this embodiment is also substituted for the control block 600 of the first embodiment, and the remaining part is employed as it is.

In the control block 600B of FIG. 11, two shift decision pressures Ptr1, Ptr2 are calculated from the target pump tilting $\theta r$ in blocks 605, 606, respectively. Here, the first shift decision pressure Ptr1 is used when the current capacity of the hydraulic motor is large, and the second shift decision pressure Ptr2 is used when the current motor capacity is small. The relationship between the target pump tilting $\theta r$ and the second shift decision pressure Ptr2 shown in the block 606 is set to have such a characteristic that a larger shift decision pressure is given at the same target pump tilting $\theta r$ as compared with the characteristic relation between the target pump tilting $\theta r$ and the first shift decision pressure Ptr1 shown in the block 605.

A block 607 is a switch for selecting either one of Ptr1 and Ptr2 dependent on the current capacity of the hydraulic motor 1. The motor tilting signal Sv from a block 603 is employed as a value for detecting the current capacity of the hydraulic motor 1. Specifically, Ptr1 is selected when Sv is in an off-state and the motor capacity is set to the large tilting, and Ptr2 is selected when Sv is in an on-state and the motor capacity is set to the small tilting, thereby presenting the final shift decision pressures Ptr in the respective cases.

Blocks 602, 603 are the same as those in the first embodiment. The block 602 compares the selected shift decision pressure Ptr with the delivery pressure Pd. If Pd≧Ptr holds, the motor tilting signal Sv is turned off to set the swash plate 1a of the hydraulic motor 1 at a larger tilting position for bringing the hydraulic motor into a low-speed, large-torque mode. If Pd<Ptr is determined to hold, the motor tilting signal Sv is turned on to set the swash plate 1a of the hydraulic motor 1 at a smaller tilting position for bringing the hydraulic motor into a high-speed, small-torque mode.

With the foregoing arrangement, since the hydraulic motor 1 is shifted toward the small capacity at a relatively low level of the load pressure when it is operated under the large capacity, and toward the large capacity at a relatively high level of the load pressure when it is operated under the small capacity, a hysteresis characteristic can be given to the shift decision pressure, which makes the system insensitive to temporary fluctuations in pressure produced when switching the capacity of the hydraulic motor, and less susceptible to hunting, as with the second embodiment.

FOURTH EMBODIMENT

A fourth embodiment of the present invention will be described below with reference to FIG. 12. In this embodiment, hydraulic control means is used as pump control means, and a control block 600C is used in place of the control block 600 of the first embodiment, while employing the remaining part as it is.

Figure 12:
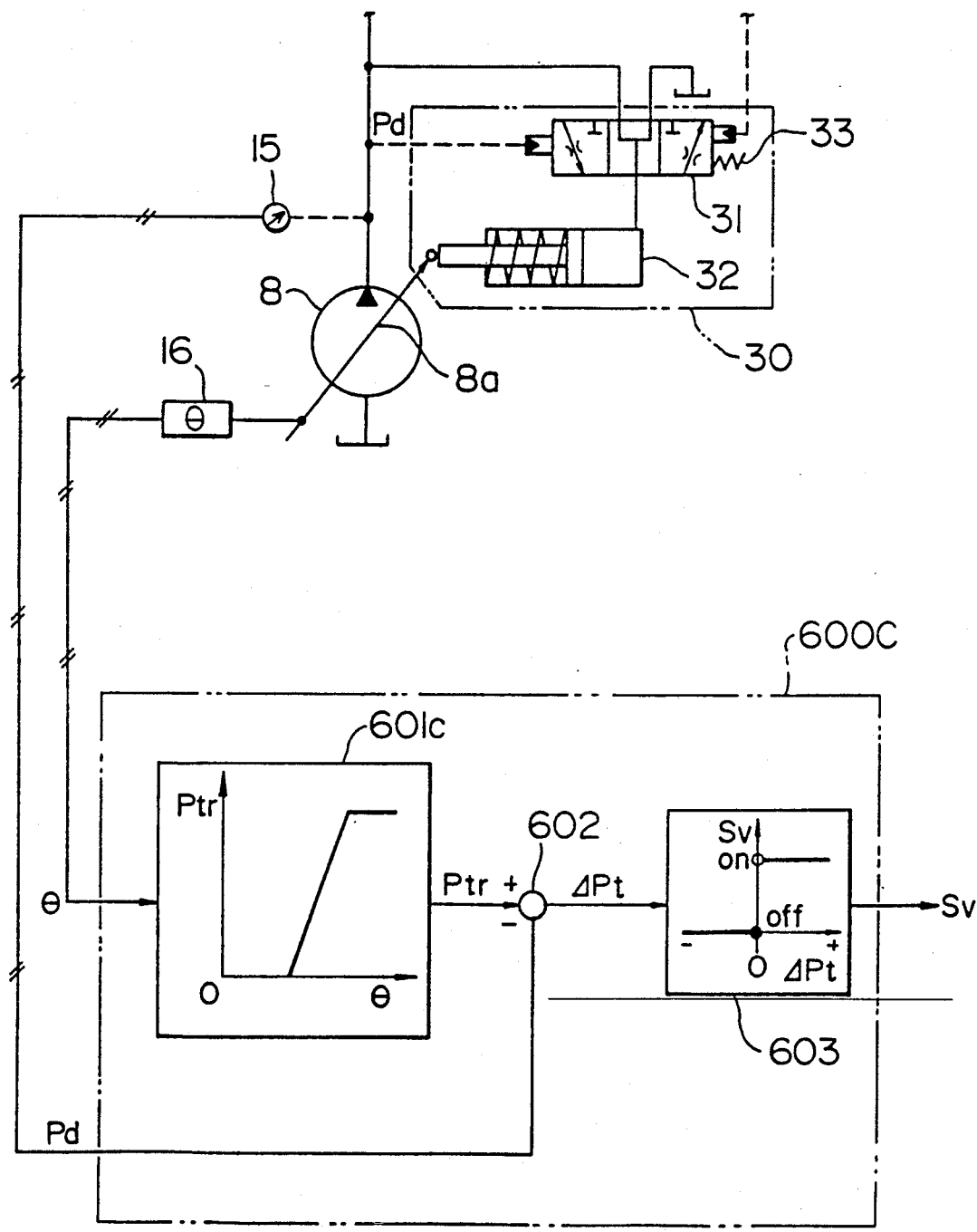
FIG. 12 is a diagram showing an important part of the hydraulic drive traveling system according to a fourth embodiment of the present invention.

In FIG. 12, a pump control unit 30 of this embodiment shifts a select valve 31 dependent on a differential pressure between the delivery pressure Pd of the hydraulic pump 8 and the load pressure PL of the hydraulic motor 1, and controls inflow and outflow of the hydraulic fluid to and from a swash plate drive cylinder 32, thereby controlling a position of the swash plate 8a, i.e., the capacity of the hydraulic pump 1, so that the differential pressure between the delivery pressure and the load pressure becomes a certain value specified by a spring 33.

In the control block 600C, an actual pump tilting $\theta$ detected by the tilting angle sensor 16 is used in place of the target pump tilting $\theta r$ to calculate a shift decision pressure Ptr from the pump tilting $\theta$.

In this embodiment, too, since the hydraulic pump 8 subjected to load sensing control in a hydraulic manner can be considered to be controlled to the flow rate demanded by the pressure compensated flow control valve 11 (see FIG. 1), it becomes possible to obtain a similar advantageous effect as that of the first embodiment.

It should be understood that this embodiment has been described as combining the hydraulic pump control unit 30 with the control block 600C, the unit 30 may be combined with the control block 500 shown in FIG. 6.

FIFTH EMBODIMENT

A fifth embodiment of the present invention will be described below with reference to FIGS. 13-16. In this embodiment, step 300 for controlling the hydraulic motor capacity in the first embodiment shown in FIG. 3 is replaced by step 300A comprising two steps 300a, 300b shown in FIG. 13, and the remaining part is employed as it is.

Figure 13:
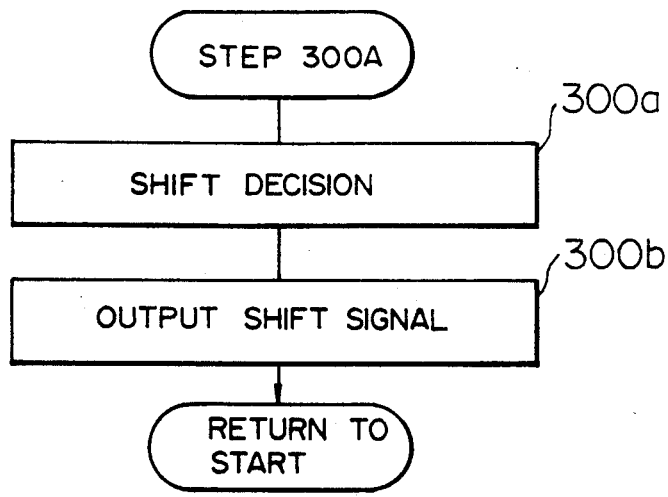
FIG. 13 is a flowchart showing capacity control of the hydraulic motor according to a fifth embodiment of the present invention.

Thus, in FIG. 13, step 300A is divided into step 300a for shift decision and step 300b for outputting a shift signal.

Figure 14:
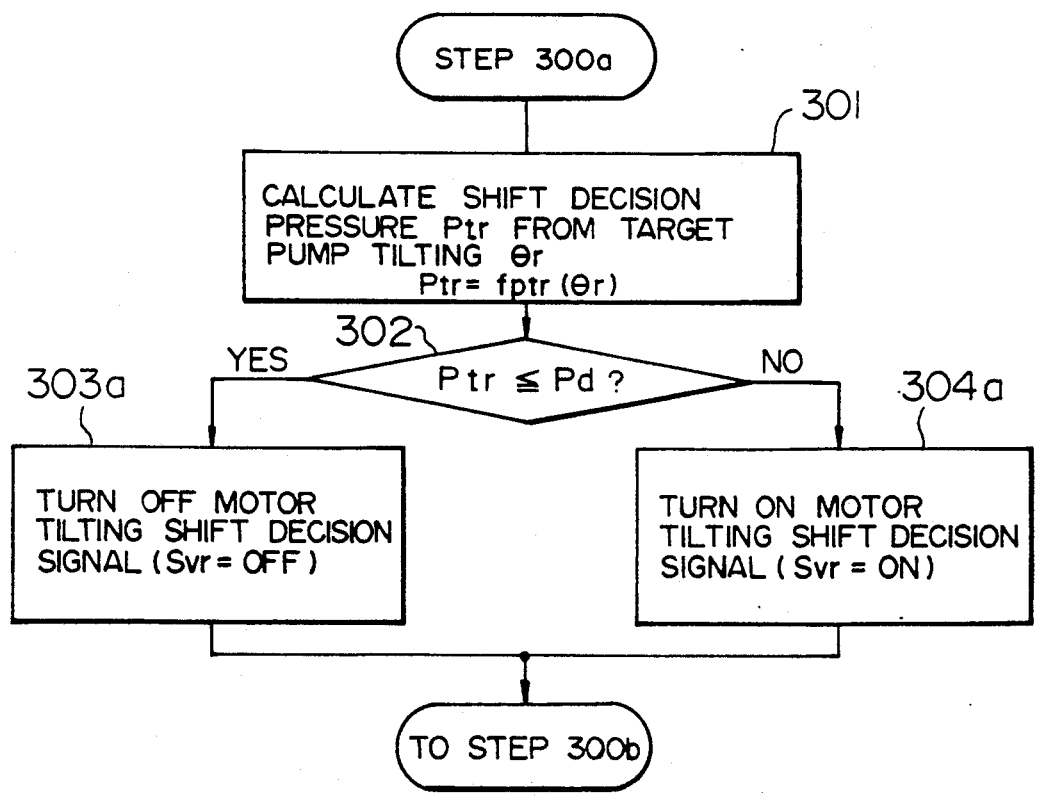
FIG. 14 is a flowchart showing details of shift decision control in the capacity control.

Details of step 300a is shown in FIG. 14. As will be seen from FIG. 14, step 300a is substantially the same as step 300 in the first embodiment shown in FIG. 7. However, step 300a is different from step 300 in that a motor tilting shift decision signal Svr is only turned off and on in steps 303a, 304a, respectively, instead of determining the motor tilting signal Sv to control the motor tilting.

Figure 15:
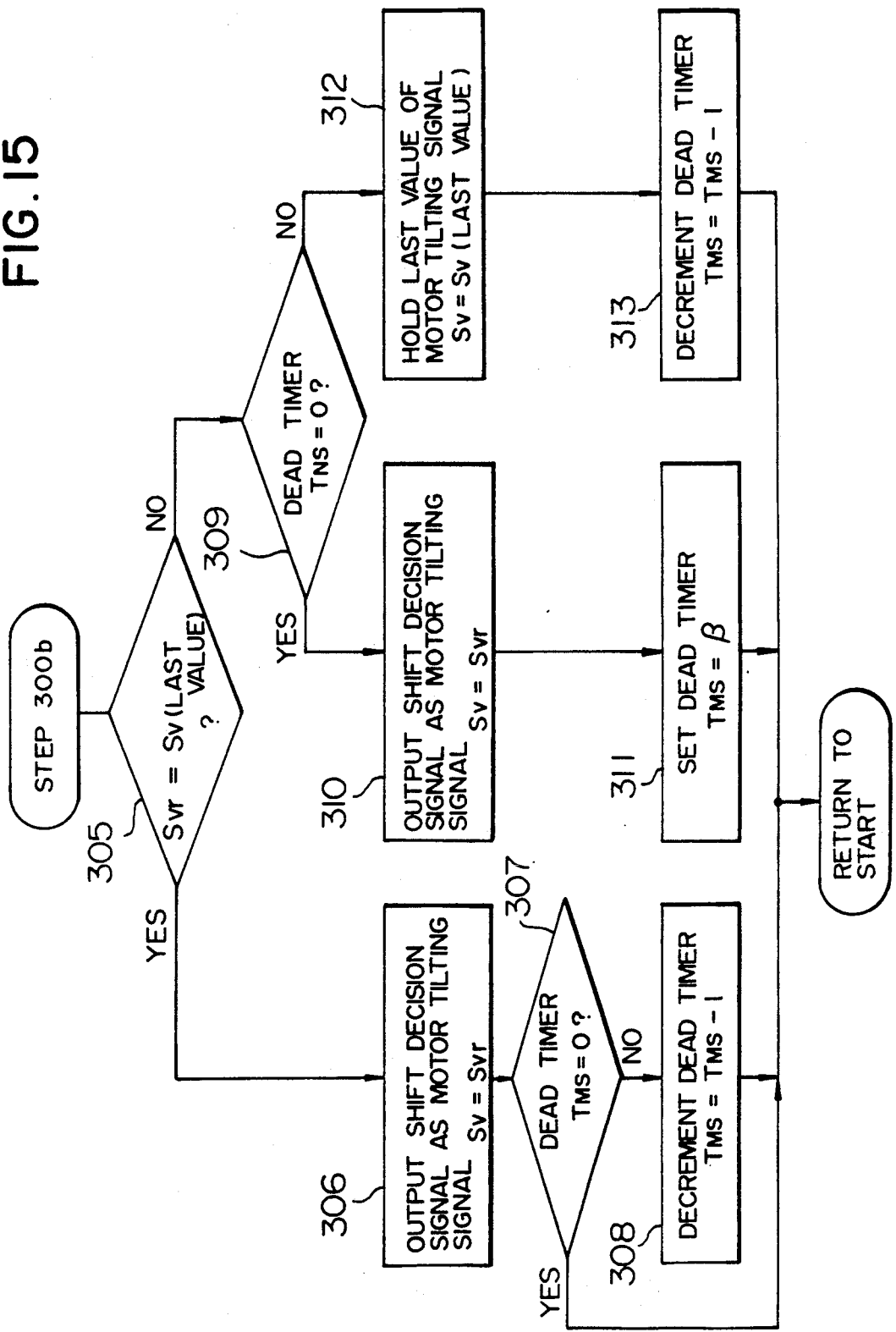
FIG. 15 is a flowchart showing details of shift signal output control in the capacity control.

Upon completion of step 300a, the process goes to step 300b. Details of step 300b are shown in FIG. 15.

In step 300b, first step 305 compares the motor tilting shift decision signal Svr set in step 300a with the motor tilting shift signal Sv issued last time. If Svr=Sv holds, i.e., unless any change is determined in the status, the process goes to step 306. In step 306, the shift decision signal Svr is output as the motor tilting signal Sv. Since Svr=Sv holds in this case, Sv remains unchanged. Then, the process goes to step 307. In step 307, it is determined whether or not a dead timer TMS for setting a dead time, during which the motor tilting should not be changed, has expired to 0. The count 0 of the dead timer TMS means that the dead time has elapsed. In this case, step 300b is completed.

If TMS≠0 is determined to hold in step 307, the process goes to step 308. In step 308, the dead timer TMS is decremented by 1 to count the dead time. Whenever the process passes through step 308, the dead timer TMS is decremented by 1 until the time count becomes 0. In other words, the dead time is determined by both a cycle at which the process passes once through step 308 and a value set on the dead timer TMS. Upon completion of step 308, step 300b is completed.

If Svr≠Sv is determined to hold in step 305, it is regarded that the status has been changed, followed by going to step 309. Step 309 determines whether or not the count of the dead timer TMS is 0. If TMS=0 holds, i.e., if the dead time is determined to have elapsed, the process goes to next step 310. In step 310, Sv=Svr is set to change the motor tilting signal Sv for shifting the motor tilting. Then, the process goes to step 311. Step 311 sets a value $\beta$ corresponding to the dead time in the dead timer TMS. In other words, since the motor tilting has been changed in step 310, the dead timer TMS is set in step 311 to newly count the dead time. Upon completion of step 311, step 300b is completed.

If TMS≠0 is determined to hold in step 309, the process goes to step 312. In step 312, the last value of the motor tilting signal Sv is set or held in order not to change the motor tilting, because the dead time has not yet expired. Then, the process goes to step 313 where the dead timer TMS is decremented by 1 to count the dead time. As with step 308 as mentioned above, whenever the process passes through step 308, the dead timer TMS is decremented by 1 until the time count becomes 0. In other words, the dead time is determined by both a cycle at which the process passes once through step 308 and a value set on the dead timer TMS. Upon completion of step 313, step 300b is completed.

When above step 300b is completed, the process returns to the start for repeating the process of step 100 shown in FIG. 3. Steps 100-300A are recirculated at all times for continuous control.

Figure 16:
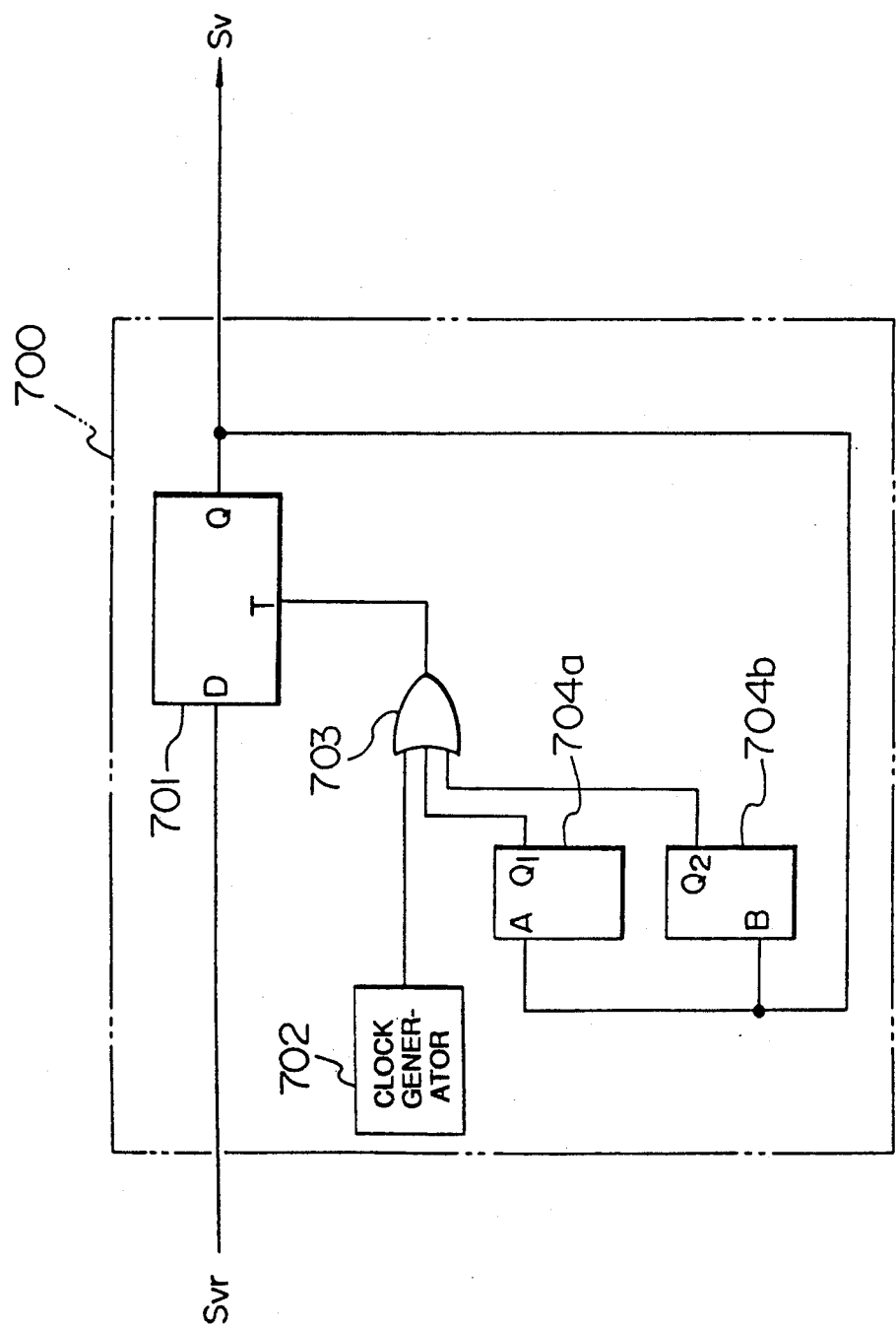
FIG. 16 is a block diagram showing the flowchart of FIG. 15 in the form of a control block.

A control block 700 representing the step 300b is shown in FIG. 16. Note that the control block 700 is shown in the form of a logical circuit for convenience of explanation.

In FIG. 16, designated by 701 is a D type flip-flop in which the signal Svr applied to a D terminal is output as the signal Sv upon rising of a trigger signal applied to a T terminal, and this status is held to continue.

702 is a clock generator which outputs a pulse signal to an OR circuit 703 at a certain cycle.

704a, 704b are each a mono-stable multivibrator. The signal Sv is applied to an A terminal of the multivibrator 704a so that upon falling of the signal Sv, i.e., when the signal Sv turns from an on-state to an off-state, an on-pulse signal is output from a Q1 terminal for a certain period of time. The multivibrator 704b receives the signal Sv at its B terminal so that upon rising of the signal Sv, i.e., when the signal Sv turns from an off-state to an on-state, an on-pulse signal is output from a Q2 terminal for a certain period of time.

The OR circuit 703 receives an output of the clock generator 702 and the outputs of the mono-stable multivibrators 704a, 704b. In a condition that the outputs of the mono-stable multivibrators 704a, 704b are both in an off-state, the output of the clock generator 702 is directly issued to the D type flip-flop 701 through the OR circuit 703. In a condition that either output of the mono-stable multivibrators 704a, 704b is in an on-state, the output of that mono-stable multivibrator is issued to the D type flip-flop 701. Stated otherwise, when the signal Svr is not changed, the signal Svr is output as the signal Sv at a cycle of the pulse signal issued from the clock generator 702, and is held as it is. When the signal Svr is changed, the signal Sv is also changed in synchronism with the next pulse signal issued from the clock generator 702. This causes the mono-stable multivibrators 704b to output the on-pulse signal for a certain period of time upon off-to-on turning of the signal Sv, and the mono-stable multivibrators 704a to output the on-pulse signal for a certain period of time upon on-to-off turning of the signal Sv. During that certain period of time, since no pulse signal issued from the clock generator 702 is input to the D type flip-flop 702, the signal Sv will remain unchanged even if the signal Svr is changed, and the status is held to continue. In other words, the period of duration time of the on-pulse signal issued from the mono-stable multivibrator 704a, 704b corresponds to the dead time set by the dead timer.

Figure 17:
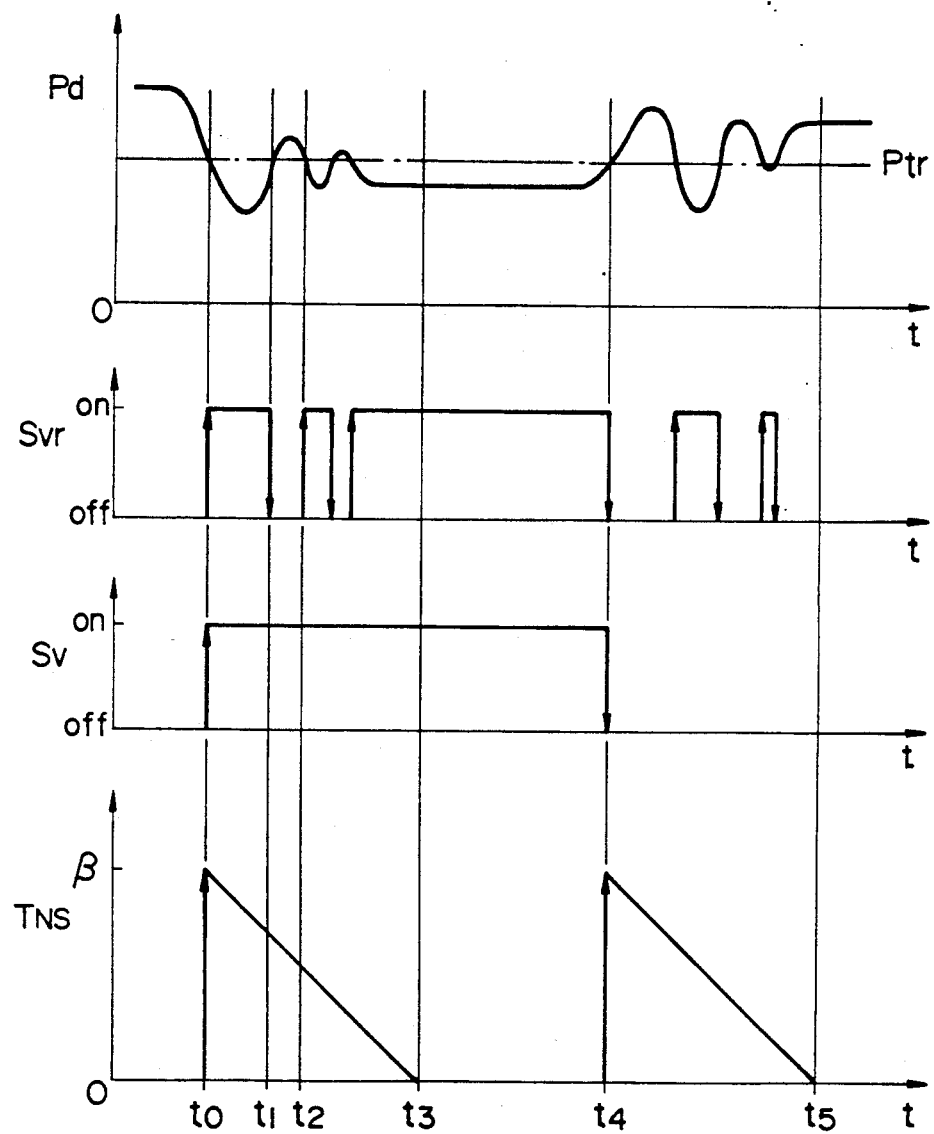
FIG. 17 is a time chart for explaining operation of the fifth embodiment.

FIG. 17 shows a time chart for explaining the operation of the entirety of step 300A of this embodiment. The time chart indicates time-dependent changes in the pump delivery pressure Pd, the motor tilting shift decision signal Svr, the motor tilting signal Sv, and counts of the dead timer TMS.

First, before time t0, in condition that $Svr = Sv = OFF$ holds in a state of $Pd \geq Ptr$, i.e., where the motor tilting is large and the count of the dead timer TMS is 0, the process follows the sequence of step 301→302→303a in FIG. 14 and the sequence of step 305→306→307→ "Return to Start" in FIG. 15.

When $Pd < Ptr$ holds at the time t0, the process now follows the sequence of step 301→302→304a in FIG. 14 and the sequence of step 305→309→310→311→ "Return to Start" in FIG. 15, whereby the motor tilting signal $Sv = Svr = ON$ is set and the motor tilting is shifted to the small side. Simultaneously, the dead timer is set to a value $\beta$.

During a period of time t0-t1, the state of $Pd < Ptr$ is continued. Thus, the process follows the sequence of step 301→302→304a and the sequence of step 305→306→307→308→ "Return to Start", whereby the state of $Sv = Svr = ON$ is held and the dead timer TMS is decremented in its count gradually.

Then, when the pump delivery pressure Pd is so affected by fluctuations of a vehicle body upon shifting of the motor tilting to the small side that $Pd \geq Ptr$ temporarily holds during the period of time t0-t1, the process follows the sequence of step 301→302→303a and the sequence of step 305→309→312→313→ "Return to Start". At this time, because the dead timer is still working on, the motor tilting signal Sv is held in an on-state regardless of fluctuations in the pump delivery pressure and the motor tilting remains small. In parallel, the dead timer TMS is being decremented consecutively.

When the state of $Pd < Ptr$ occurs again at time t2, the process following the sequence of step 301→302→304a and the sequence of step 305→306→307→308→ "Return to Start" is resumed so as to hold the state of $Sv = Svr = ON$. Since the time t2, the dead timer TMS keeps decrementing its count.

During a period of time t2-t3, even if the pump delivery pressure Pd is fluctuated, the above-mentioned process is performed so as to hold the motor tilting on the small side.

At time t3, the dead timer TMS expires to 0 and the pump delivery pressure is stabilized in the state of $Pd < Ptr$. Since then, therefore, the process follows the sequence of step 301→302→304a and the sequence of step 305→306→307→ "Return to Start", whereby the state of $Sv = Svr = ON$ is held continuously.

When the motor load is increased and the state of $Pd < Ptr$ occurs at time t4, the motor tilting is immediately shifted to the large side because the count of the dead timer is 0. Afterward, because the dead timer keeps working on until time t5, the motor tilting is held on the large side regardless of fluctuations in the pump delivery pressure due to shifting of the motor tilting.

With this embodiment thus arranged, since the dead timer is provided in the block 700, it becomes possible to achieve control in such a manner that the motor tilting can quickly be shifted from one to the other side at the time when such shifting must be effected upon a change in the actual traveling load, while the motor tilting cannot be shifted with temporary fluctuations in the pump delivery pressure produced upon shifting of the motor tilting, whereby hunting is less likely to occur.

Note that although this embodiment has been described as preventing the occurrence of hunting by only setting the dead timer TMS, it may be combined with the above-mentioned third embodiment to give a hysteresis characteristic to the shift decision pressure. In this case, even with the dead timer TMS being set to a relatively short time, it is possible to surely prevent hunting and positively shift the motor shifting upon vital changes in the relationship between Pd and Ptr, thereby improving the traveling performance.

SIXTH EMBODIMENT

A sixth embodiment of the present invention will be described below with reference to FIG. 18. In this embodiment, the present invention is applied to a traveling system which has two hydraulic motors associated with right and left road wheels, respectively.

Figure 18:
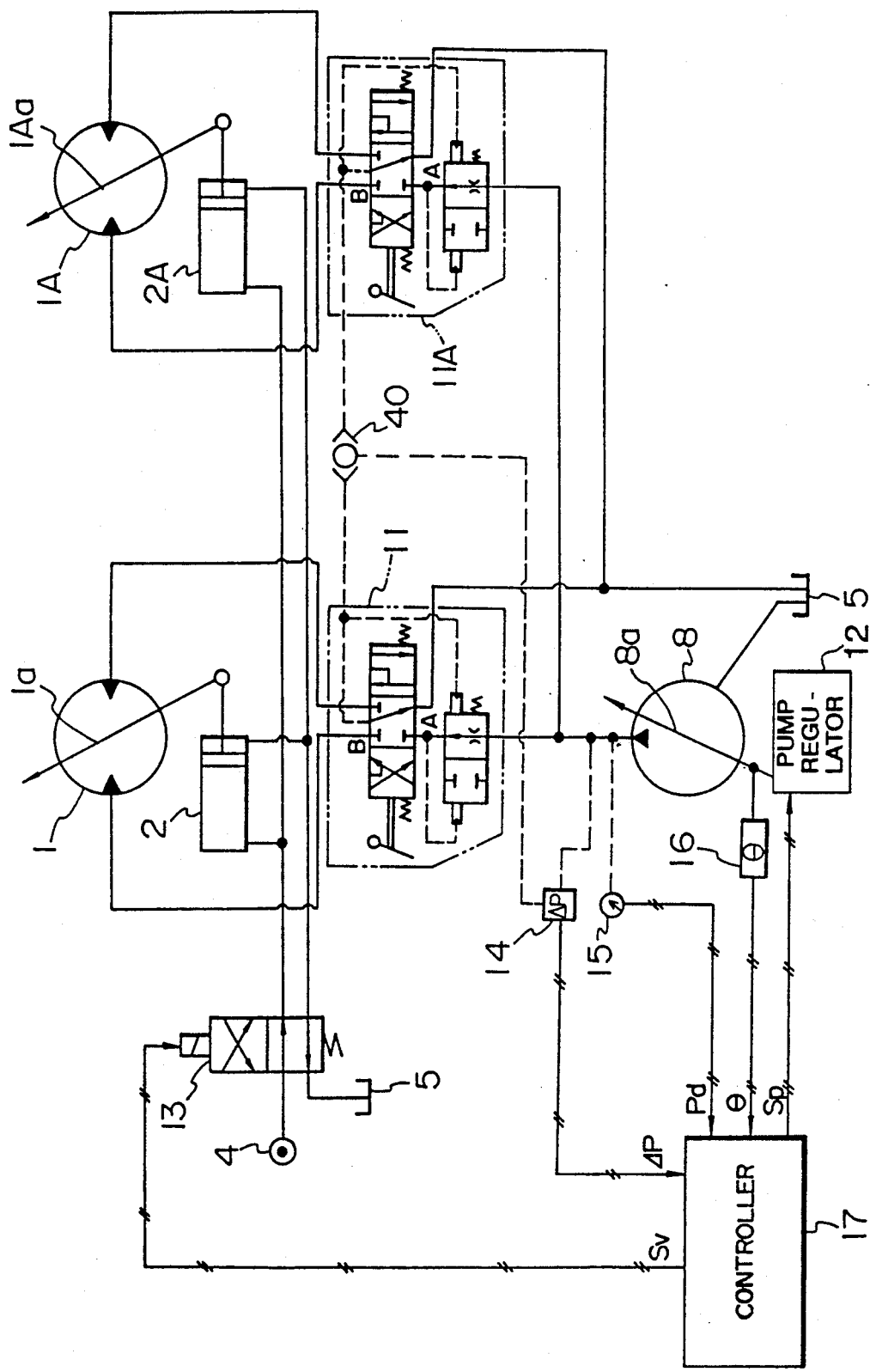
FIG. 18 is a schematic diagram of the hydraulic drive traveling system according to a sixth embodiment of the present invention.

In FIG. 18, a second hydraulic motor 1A of variable displacement type is provided in addition to the hydraulic motor 1, and has its capacity variable through a swash plate 1Aa driven by a cylinder 2A. The cylinder 2A is selectively switched or shifted in its connection with a pilot hydraulic source 4 and a tank 5 by a solenoid select valve 13 common to the cylinder 2. The flow rate of a hydraulic fluid supplied to the hydraulic motor 1A from a hydraulic pump 8 is controlled by a pressure compensated flow control valve 11A.

Load pressures taken out of the pressure compensated flow control valves 11, 11A are introduced to a shuttle valve 40 which selects the higher pressure therebetween. A differential pressure sensor 14 detects a differential pressure $\Delta P$ between the selected load pressure, i.e., the maximum load pressure, and the delivery pressure Pd of the hydraulic pump 8, and sends a corresponding electric signal to a controller 17.

The controller 17 has the same functions as those in the first embodiment. Specifically, a pump regulator 12 controls a position of the swash plate 8a, i.e., the delivery capacity of the hydraulic pump 8, dependent on an electric signal Sp from the controller 17. The solenoid select valve 13 shifts the inflow direction of the hydraulic fluid from the pilot hydraulic source 4 to the cylinders 2, 2A dependent on an electric signal Sv from the controller 17.

Since the controller 17 functions in a like manner to that in the first embodiment, this embodiment can also provide the similar advantageous effect as with the first embodiment.

SEVENTH EMBODIMENT

A seventh embodiment of the present invention will be described below with reference to FIGS. 19-21. In this embodiment, step 300 for controlling the hydraulic motor capacity in the first embodiment shown in FIG.

Figure 19:
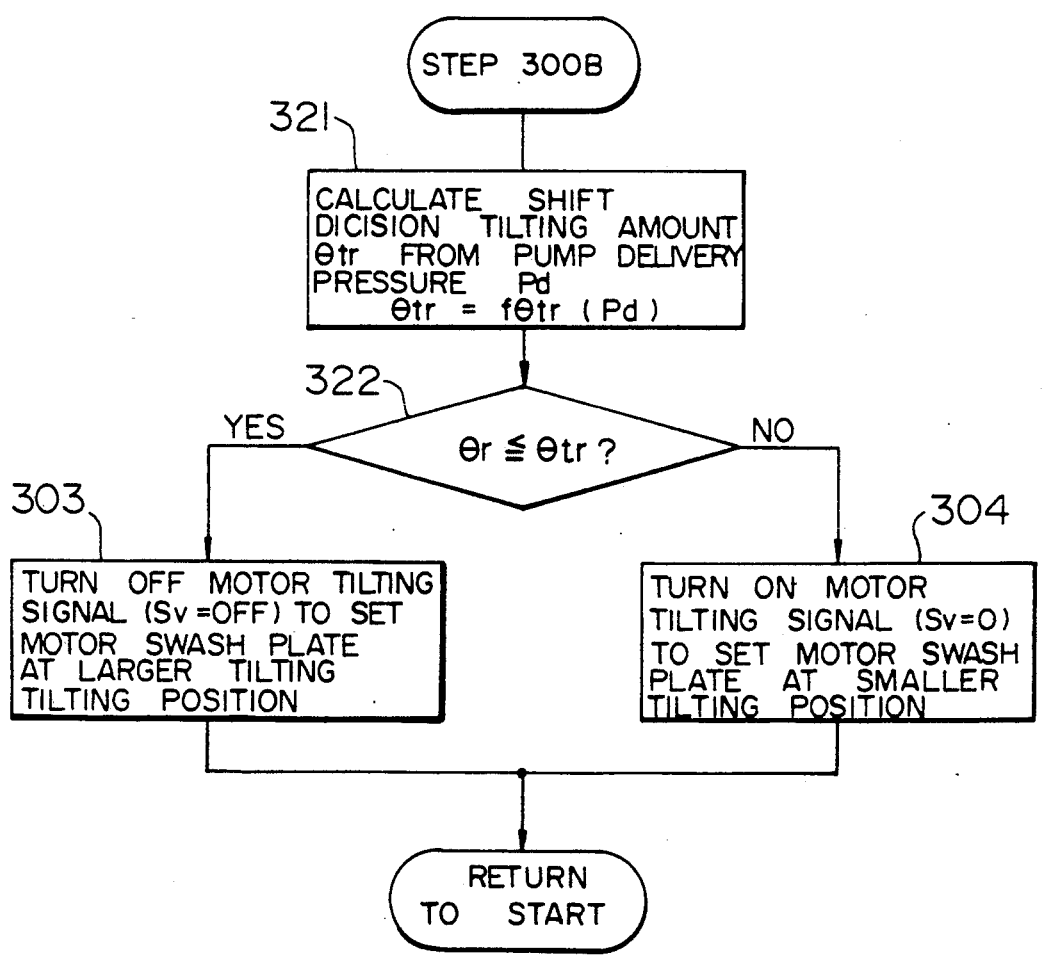
FIG. 19 is a flowchart showing capacity control of the hydraulic motor according to a seventh embodiment of the present invention.

7 is replaced by step 300B shown in FIG. 19, and the remaining part is employed as it is.

More specifically, in FIG. 19, a shift decision tilting amount $\theta$tr is calculated in step 321 from the delivery pressure Pd of the hydraulic pump 8 detected by the pressure sensor 15. Here, the relationship of $\theta$tr=f$\theta$tr(Pd) between Pd and $\theta$r has such a characteristic that $\theta$tr=$\theta$tr0 holds at Pd=0 and, as Pd increases, $\theta$tr becomes larger proportionally, as indicated by a solid line in FIG. 20.

Then, step 322 compares the shift decision tilting amount $\theta$tr with the target pump tilting $\theta$r. If $\theta$r≦$\theta$tr holds, the process goes to step 303 where the motor tilting signal Sv is turned off to set the swash plate 1a of the hydraulic motor 1 at a larger tilting position for bringing the hydraulic motor into a large-torque, low-speed mode.

If $\theta$r>$\theta$tr is determined in step 322, the process goes to step 304 where the motor tilting signal Sv is turned on to set the swash plate 1a of the hydraulic motor 1 at a smaller tilting position for bringing the hydraulic motor into a small-torque, high-speed mode.

Figure 21:
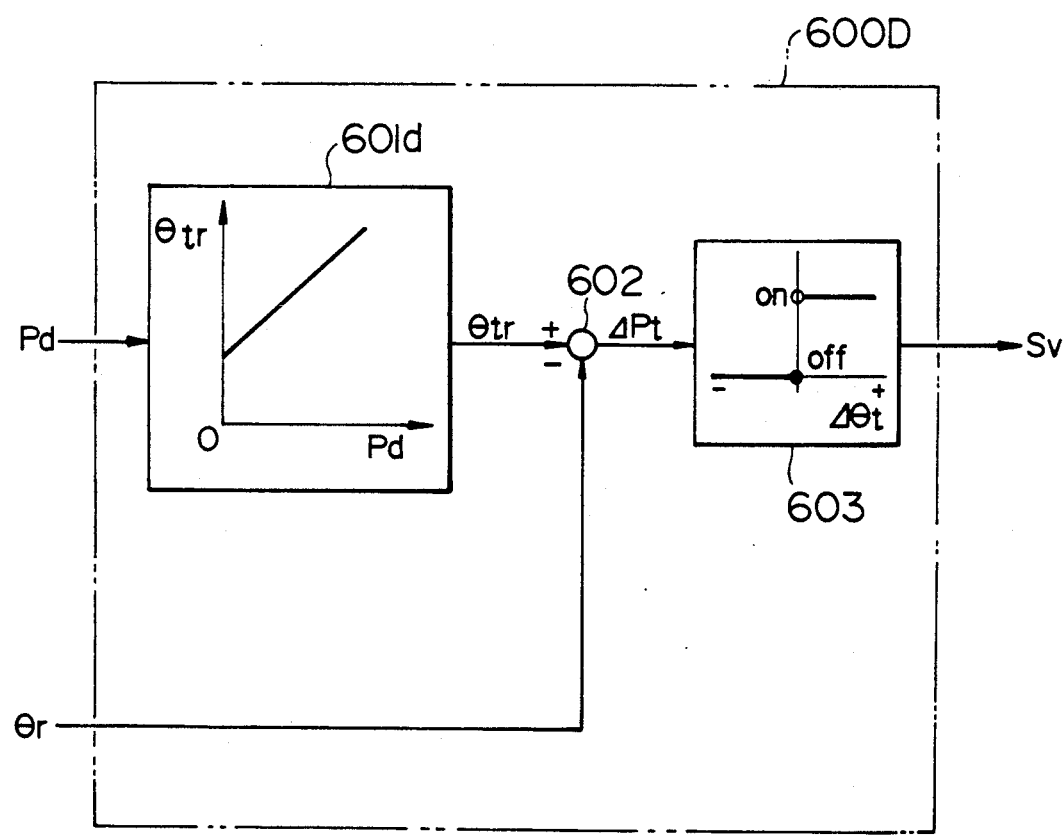
FIG. 21 is a block diagram showing the flowchart of FIG. 19 in the form of a control block.

The foregoing sequence of step 300B is shown in FIG. 21 in the form of a control block 600D. In FIG. 21, a block 601d corresponds to step 321 in FIG. 19 and blocks 602, 603 correspond to steps 322, 303. 304 therein, respectively.

Figure 20:
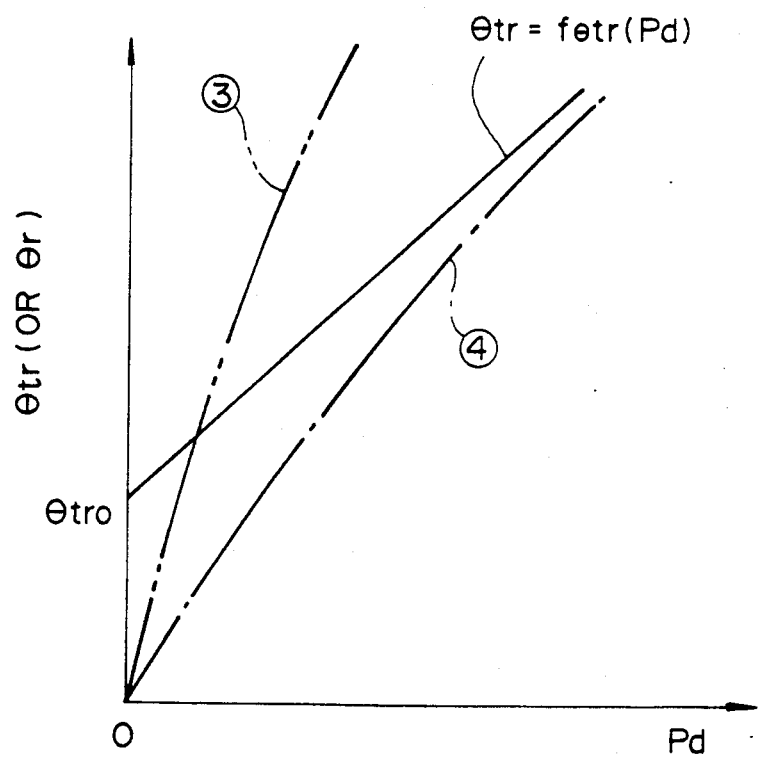
FIG. 20 is a graph showing the relationship between a pump delivery pressure Pd and a shift decision tilting amount $\theta tr$.

Here, characteristics of Pd and $\theta$tr shown in FIG. 20 or the block 601d of FIG. 21 are set similarly to those of $\theta$r and Ptr shown in FIG. 8.

More specifically, in FIG. 20, a curve ③ plots the relationship between the delivery pressure Pd of the hydraulic pump 8 and the target pump tilting $\theta$r to be established when traveling on a flat road with the tilting angle of the hydraulic motor 1 held fixed to the small tilting side, i.e., the small torque side. Also, a curve ④ plots the relationship between the delivery pressure Pd and the target pump tilting $\theta$r to be established when ascending a sloped road with the motor tilting angle held fixed to the large tilting side, i.e., the large torque side, in an attempt to always increase climbing force with the large motor tilting angle. The characteristic line of Pd−$\theta$tr is set to intersect the curve ③, and thereafter progressively approach the curve ④.

With the characteristic set as mentioned above, supposing that the target pump tilting $\theta$r and the pump delivery pressure Pd are changed along the curve while traveling on a flat road, the hydraulic motor is always operated with the large motor tilting, i.e., in the low-speed mode, because of $\theta$tr≧$\theta$r in a region where Pd is smaller than the value of Pd at which the curve③ intersects the characteristic line of Pd−$\theta$tr, and is always operated with the small motor tilting, i.e., in the high-speed mode, because of $\theta$tr<$\theta$r in a region where Pd is larger than the value of Pdr at the intersect. Thus, a wide speed range can be provided by selectively using both the low-speed mode and the high-speed mode. Furthermore, when ascending a sloped road of which slope requires to produce the pump delivery pressure given by the curve ④, the hydraulic motor is always operated with the large motor tilting, i.e., in the large-torque mode, because of $\theta$tr≧$\theta$r, making it possible to produce the increased climbing force.

Accordingly, when traveling at a low speed is demanded, the target pump tilting $\theta$r becomes so small that $\theta$tr≧$\theta$r holds even with the lower load pressure while traveling on a flat road. The hydraulic motor 1 can be hence shifted toward the large capacity to be operated in the low-speed mode for improvement in operability with fine control. Even when the load pressure is increased upon coming into a sloped road to ascend, the relationship of $\theta$tr≧$\theta$r is not changed, with the result that the hydraulic motor 1 remains shifted toward the large capacity and is driven in the low-speed, large-torque mode.

Meanwhile, when traveling at a high speed is demanded, the target pump tilting $\theta$r becomes so large that $\theta$tr<$\theta$r holds at the lower load pressure while traveling on a flat road. The hydraulic motor can be hence shifted toward the small capacity to be operated in the high-speed mode. When the load pressure is further increased so as to enter the relationship of $\theta$tr≧$\theta$r upon coming into a sloped road to ascend, the hydraulic motor 1 is automatically shifted to the low-speed, large-torque mode.

According to this embodiment too, therefore, it is possible to improve operability with fine control while traveling on a flat road, and to take a wide speed range from low speed to high speeds, as with the first embodiment.

Note that this embodiment can also be modified in a like manner to the second embodiment shown in FIG. 10, the third embodiment shown in FIG. 11, the fourth embodiment shown in FIG. 12, the fifth embodiment shown in FIGS. 13–17, and the sixth embodiment shown in FIG. 18. By way of example, a modification similar to the third embodiment shown in FIG. 11 is shown in FIG. 22.

Figure 22:
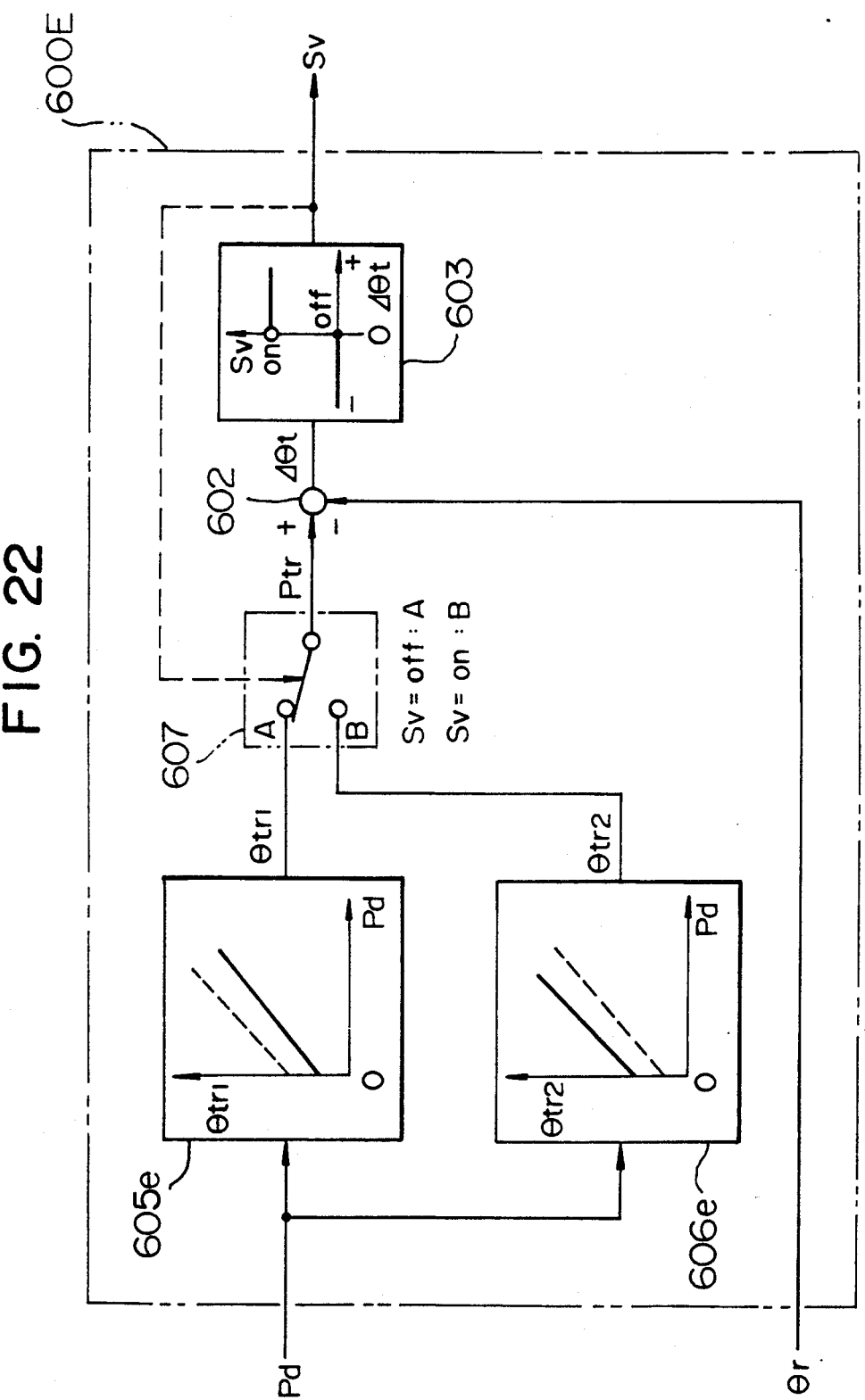
FIG. 22 is a block diagram showing a modification of the seventh embodiment in the form of a control block.

In a control block 600E of FIG. 22, two shift decision tilting amounts $\theta$tr1, $\theta$tr2 are calculated from the pump delivery pressure Pd in blocks 605e, 606e, respectively. Here, the first shift decision tilting amount $\theta$tr1 is used when the current capacity of the hydraulic motor is large, and the second shift decision tilting amount $\theta$tr2 is used when the current motor capacity is small. The second shift decision pump tilting amount $\theta$tr2 shown in the block 606e is set to have such a characteristic that a larger shift decision tilting amount is given at the same pump delivery pressure Pd as compared with the first shift decision tilting amount $\theta$tr1 shown in the block 605e.

With this embodiment, since a hysteresis characteristic is given to the shift decision tilting amount, the system can be made insensitive to temporary fluctuations in pressure produced when switching the capacity of the hydraulic motor, and less susceptible to hunting, as with the second embodiment.

EIGHTH EMBODIMENT

An eighth embodiment of the present invention will be described below with reference to FIGS. 23–30.

Figure 23:
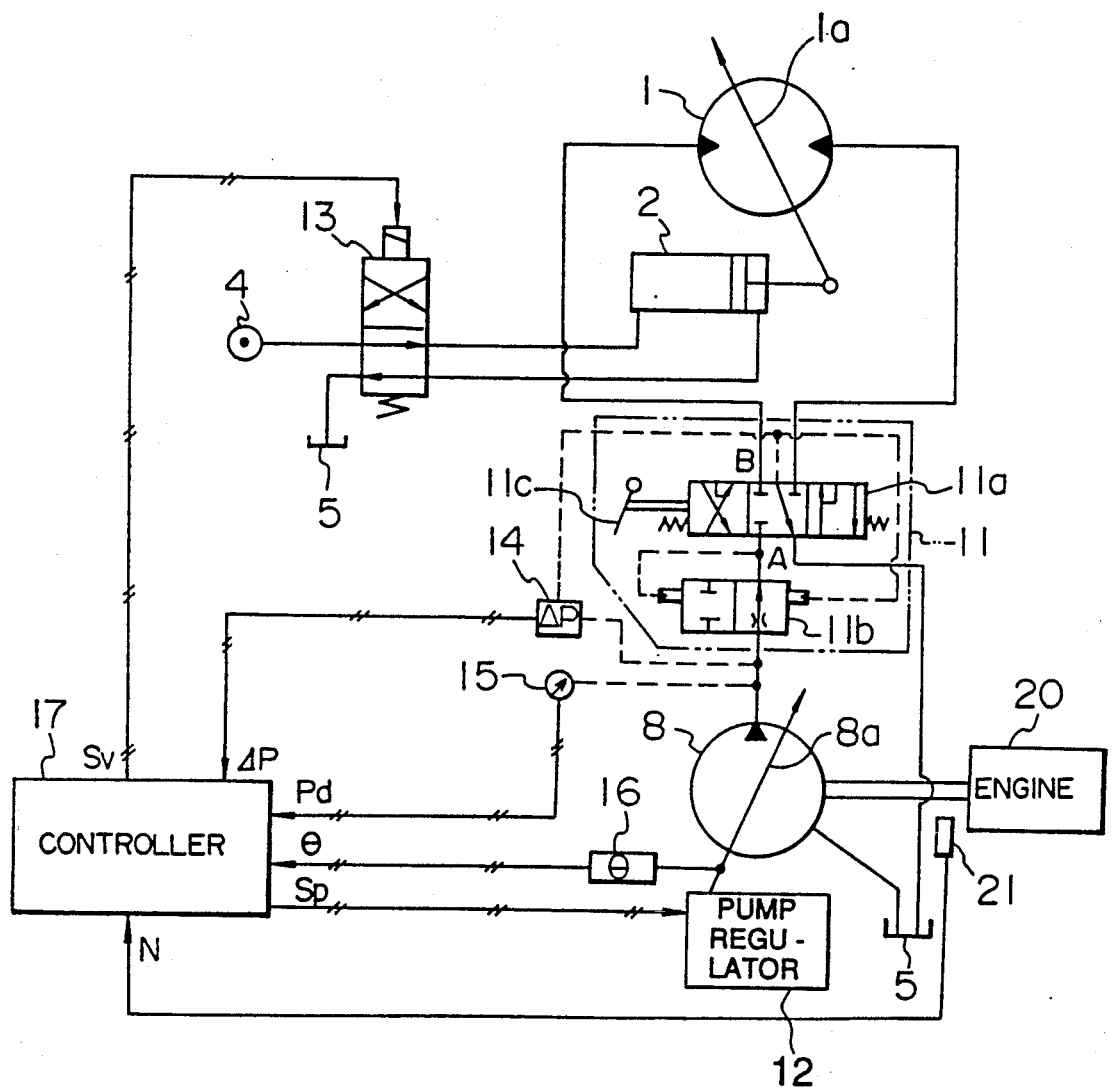
FIG. 23 is a schematic diagram of the hydraulic drive traveling system according to an eighth embodiment of the present invention.

In FIG. 23, designated by 20 is an engine for driving a hydraulic pump 8. The engine 20 is provided on its output shaft with a revolution sensor 21 which detects a revolution speed of the engine 20 and outputs it to a controller 17 after conversion to an electric signal. The configuration of hardware of the traveling system is the same as that of the embodiment shown in FIG. 1 except for the additional provision of the revolution sensor 21.

Figure 24:
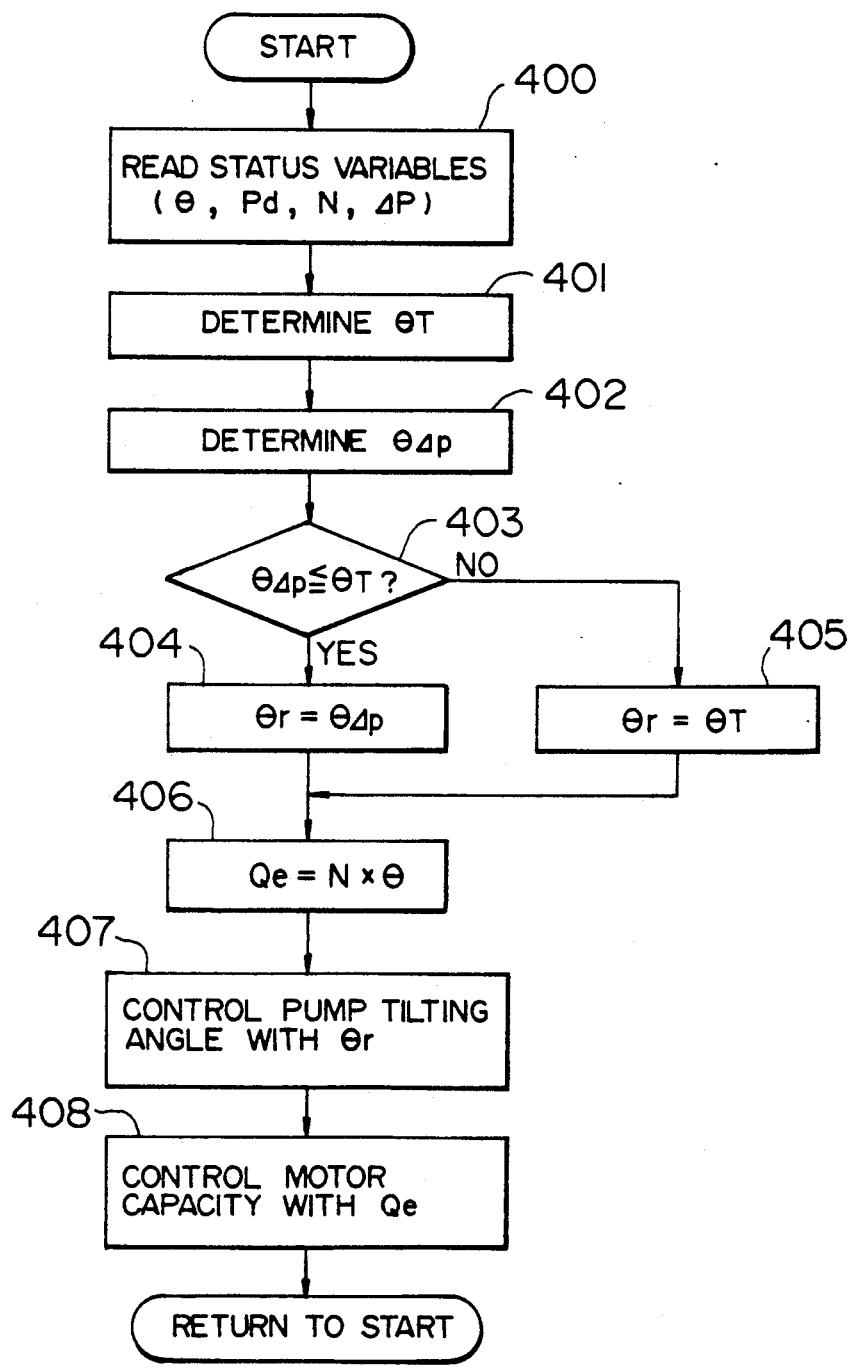
FIG. 24 is a flowchart showing the control procedure executed in the controller.

The controller 17 executes the control process shown in a flowchart of FIG. 24. That control process will be explained below.

First, in step 400, the delivery pressure Pd of the hydraulic pump 8, the tilting angle $\theta$, the differential pressure $\Delta$P between the delivery pressure Pd of the hydraulic pump 8 and the load pressure Pam of the hydraulic motor 1, and the revolution speed N of the engine 20 are read and stored from a differential pressure sensor 15, a tilting angle sensor 16 and a revolution sensor 21.

Figure 25:
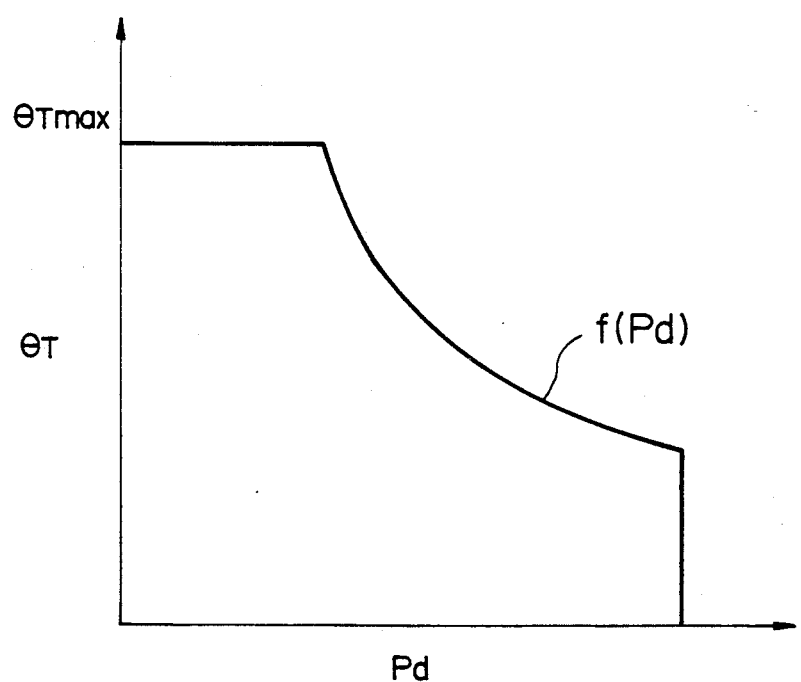
FIG. 25 is a graph showing an input torque limiting function used to determine a first temporary target tilting angle for horse power limiting control.

Then, step 401 calculates a first temporary target tilting angle $\theta T$ from both the delivery pressure Pd and an input torque limiting function f(Pd) set in advance for horsepower control aiming to limit input torque of the engine 20 so that the delivery rate is kept within an output horsepower range of the engine 20. FIG. 25 shows an example of the input torque limiting function. In FIG. 25, the horizontal axis represents the delivery pressure Pd and the vertical axis represents the first temporary target tilting angle $\theta T$ based on the input torque limiting function f(Pd). The input torque of the hydraulic pump 8 is in proportion to the product of the tilting angle of the swash plate 8a and the delivery pressure Pd. Accordingly, the input torque limiting function f(Pd) is by a hyperbolic curve or an approximate hyperbolic curve.

Then, step 402 calculates a second temporary target tilting angle $\theta \Delta p$ from the differential pressure $\Delta P$ detected by the differential pressure sensor 14 for load sensing control aiming to hold that differential pressure constant. The manner of determining $\theta \Delta p$ is similar to that of determining the target pump tilting $\theta i$ shown in steps 201, 202, 203 of FIG. 4.

After determining the first and second temporary target tilting angles $\theta T$, $\theta \Delta p$ as mentioned above, step 403 determines which one is larger. If the second temporary target tilting angle $\theta \Delta p$ is not larger than the first temporary target tilting angle $\theta T$, the process goes to step 404 where $\theta \Delta p$ is selected as a genuine target tilting angle $\theta r$. In the opposite case, the process goes to step 405 where $\theta T$ is selected as the genuine target tilting angle $\theta r$. Stated otherwise, the lesser one of the first and second temporary target tilting angles is selected as the genuine target tilting angle $\theta r$, so that the genuine target tilting angle $\theta r$ will not exceed a limit value ($\theta T$) determined by the input torque limiting function f(Pd).

Then, step 406 calculates $Qe = N \times \theta$ from both the tilting angle $\theta$ of the hydraulic pump 8 detected by the tilting angle sensor 16 and the revolution number N of the engine 20 detected by the revolution sensor 21, thereby determining a delivery rate Qe of the hydraulic pump 8.

Subsequently, step 407 determines a control signal Sp from both the genuine target tilting angle $\theta r$ determined as mentioned above and the tilting angle $\theta$ detected by the tilting angle sensor 16, and outputs the control signal Sp to the pump regulator 12. The manner of determining the control signal Sp is similar to that of determining the control signal Sp shown in FIG. 5.

Thus, the tilting angle $\theta$ of the hydraulic pump 8 is controlled to be coincident with the target tilting angle $\theta r$. More specifically, when the second temporary target tilting angle $\theta \Delta p$ is not larger than the first temporary target tilting angle $\theta T$, the tilting angle of the hydraulic pump 8 is controlled to become the second temporary target tilting angle $\theta \Delta p$ for carrying out the load sensing control so that the differential pressure between the delivery pressure and the load pressure of the hydraulic pump 8 is held constant. When the second temporary target tilting angle $\theta \Delta p$ is larger than the first temporary target tilting angle $\theta T$, the tilting angle of the hydraulic pump 8 is limited to the first temporary target tilting angle $\theta T$ for carrying out the horsepower limiting control so that product of the delivery rate and the delivery pressure of the hydraulic pump 8 is held within an output horsepower range of the engine 1.

Returning to FIG. 24, after controlling the pump tilting angle as mentioned above, the capacity of the hydraulic motor 1 is controlled in step 408 using the pump delivery rate Qe determined by step 406.

Figure 26:
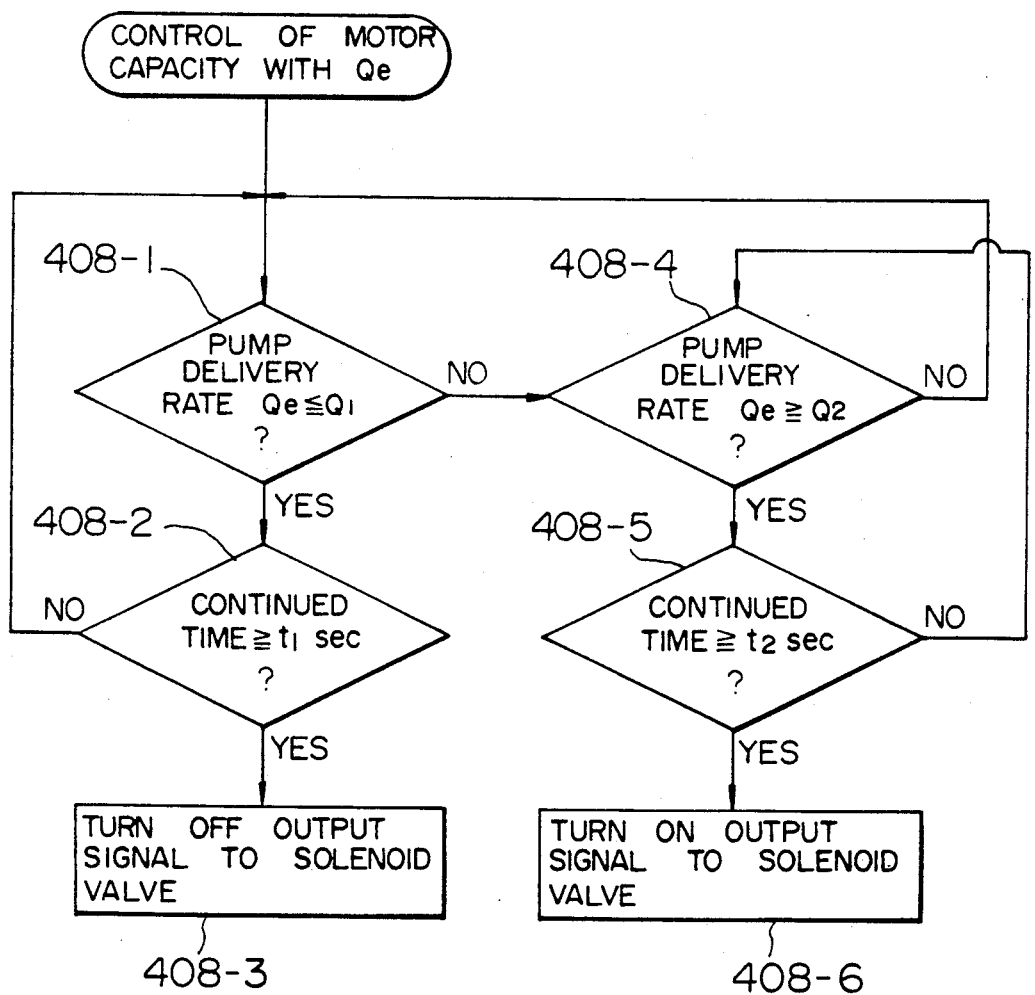
FIG. 26 is a flowchart showing capacity control of the hydraulic motor.

FIG. 26 shows details of step 408 in the form of a flowchart. First, step 408-1 determines whether or not the pump delivery rate Qe is equal to or smaller than a first value Q1 set in advance. If the decision result is YES (Qe $\leq$ Q1), the process goes to step 408-2 where it is determined whether or not that state has continued for a predetermined period of time t1 sec set in advance or more. If the decision result is YES, the process goes to step 408-3 where an off-signal is output to the solenoid select valve 13 for shifting the hydraulic motor 1 toward the large tilting (large capacity) $\alpha 1$.

If the decision result is NO in step 408-2, the process returns to step 408-1 again to repeat the foregoing sequence. This prevents the capacity of the hydraulic pump 1 from being shifted uselessly when the pump delivery rate is reduced just temporarily.

If the decision result is NO (Qe > Q1) in step 408-1, the process goes to step 408-4 where it is determined whether or not the pump delivery rate Qe is equal to or larger than a second value Q1 set in advance to be greater than the first setting value Q1. If the decision result is YES (Qe $\geq$ Q2) in step 408-4, the process goes to step 408-5 where it is determined whether or not that state has continued for a predetermined period of time t2 sec set in advance or more. If the decision result is YES, the process goes to step 408-5 where an on-signal is output to the solenoid select valve 13 for shifting the hydraulic motor 1 toward the small tilting (small capacity) $\alpha 2$.

If the decision result is NO in step 408-5, the process returns to step 408-4 again to repeat the foregoing sequence. This prevents the capacity of the hydraulic pump 1 from being shifted uselessly when the pump delivery rate is reduced just temporarily.

If the decision result is NO (Qe < Q2) in step 408-4, the process returns to step 408-1 to repeat the foregoing sequence of steps 408-1, 408-4. As a result, when the pump delivery rate Qe is in a state of Q1 < Qe < Q2, the output signal as produced before coming into that state is output to the solenoid select valve 13, whereby the capacity of the hydraulic motor 1 at that time is held.

In this connection, the second setting value Q2 compared with the pump delivery rate Qe in step 408-4 is determined so as to meet the following relationship for the first setting value Q1:

$$Q2 \geq (\alpha 2/\alpha 1)Q1 - c \qquad (1)$$

In the right side of the equation (1), the first term ($\alpha 2/\alpha 1$)Q1 represents a theoretical change amount of the delivery rate due to a change in the delivery pressure of the hydraulic pump 8 as produced when shifting the capacity of the hydraulic motor from the small capacity $\alpha 1$ to the large capacity $\alpha 2$. The second term in the right side represents a value in terms of flow rate of a change in pressure loss through the line as produced when shifting the capacity of the hydraulic motor. In other words, the first and second setting values Q1, Q2 are set to such values that the difference between those values becomes larger than the change amount of the delivery rate of the hydraulic pump 8 as produced when shifting the motor capacity from the small capacity α1 to the large capacity α2.

Figure 27:
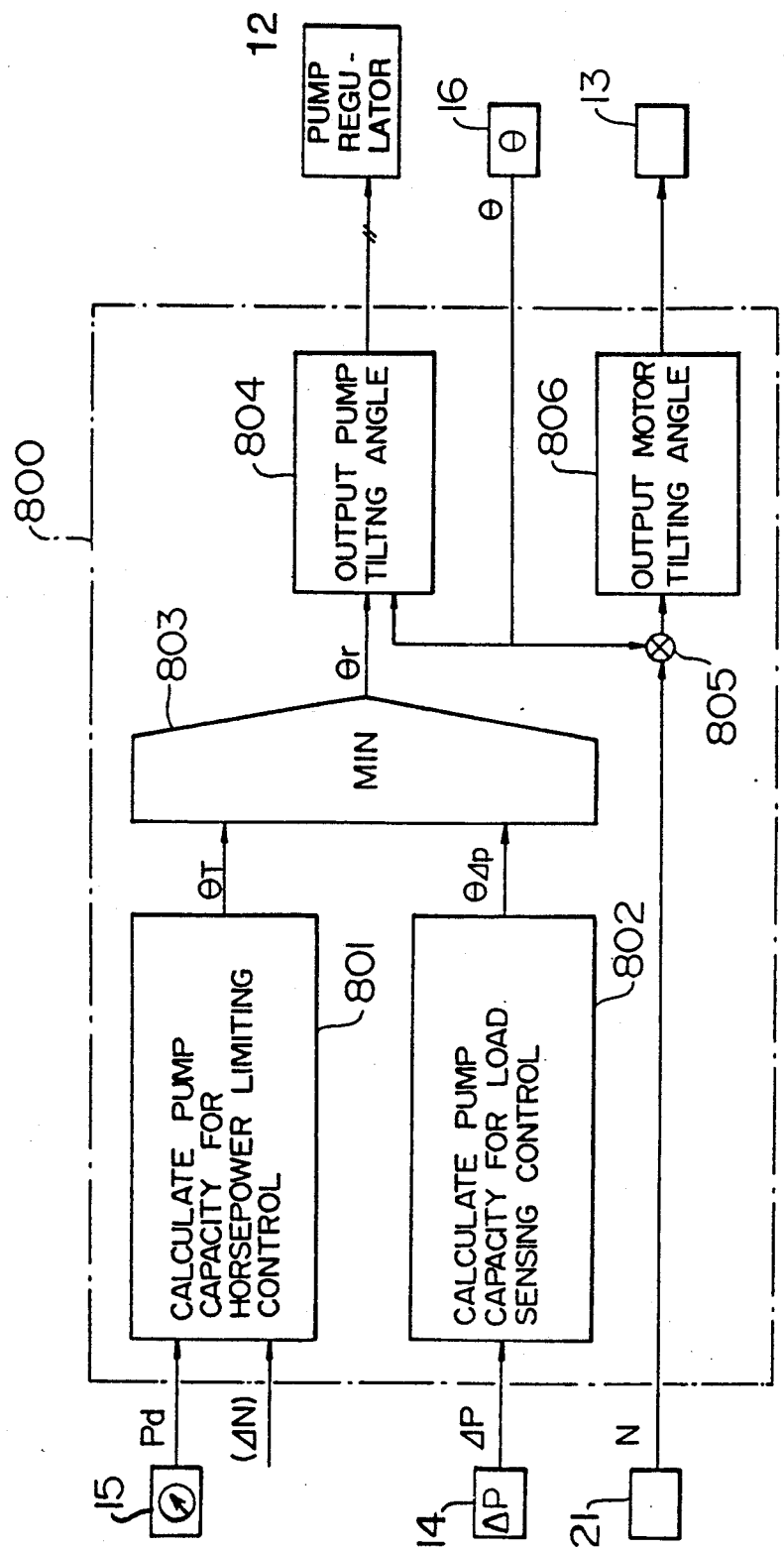
FIG. 27 is a block diagram showing the flowchart of FIG. 24 in the form of a control block.

The entirety of the foregoing process sequence is shown in FIG. 27 as a control block 800. In FIG. 27, a block 801 corresponds to step 401 in FIG. 24 and calculates the first temporary target tilting angle θT for the horsepower limiting control based on the input torque limiting function shown in FIG. 25. A block 802 corresponds to step 402 and calculates the second temporary target tilting angle θΔp for the load sensing control. A block 803 corresponds to steps 403, 404, 405 in FIG. 24 and selects a minimum value between θT and θΔp as the genuine target tilting angle θr. A block 804 corresponds to step 407 in FIG. 24 and controls the swash plate tilting angle of the hydraulic pump 8 to be coincident with θr. A block 805 corresponds to step 406 in FIG. 24 and calculates Qe=N×θ. A block 806 corresponds to step 408 in FIG. 24 and controls the capacity of the hydraulic motor 1.

Figure 28:
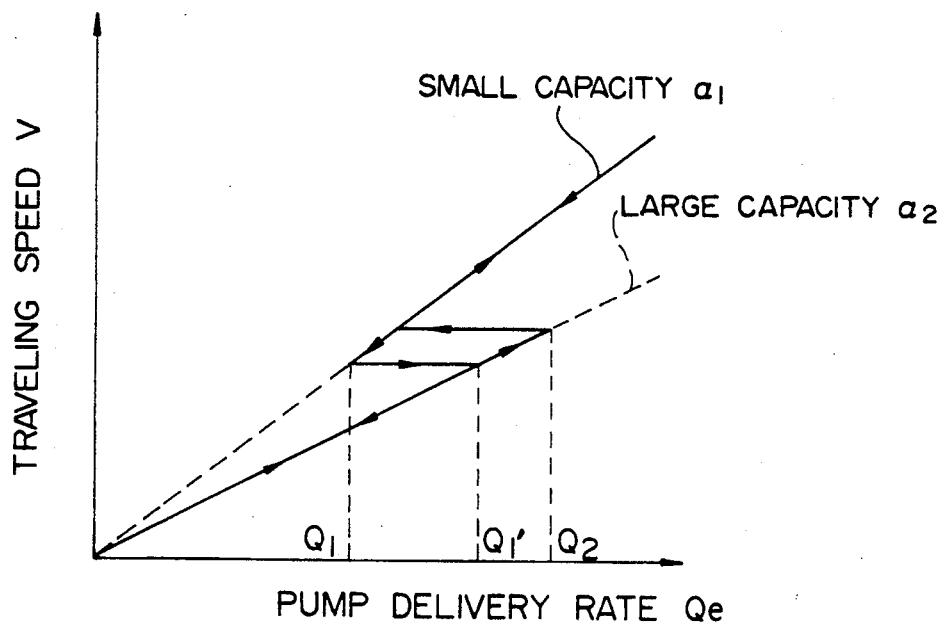
FIG. 28 is a graph showing the relationship between a pump delivery rate and a traveling speed.
Figure 29:
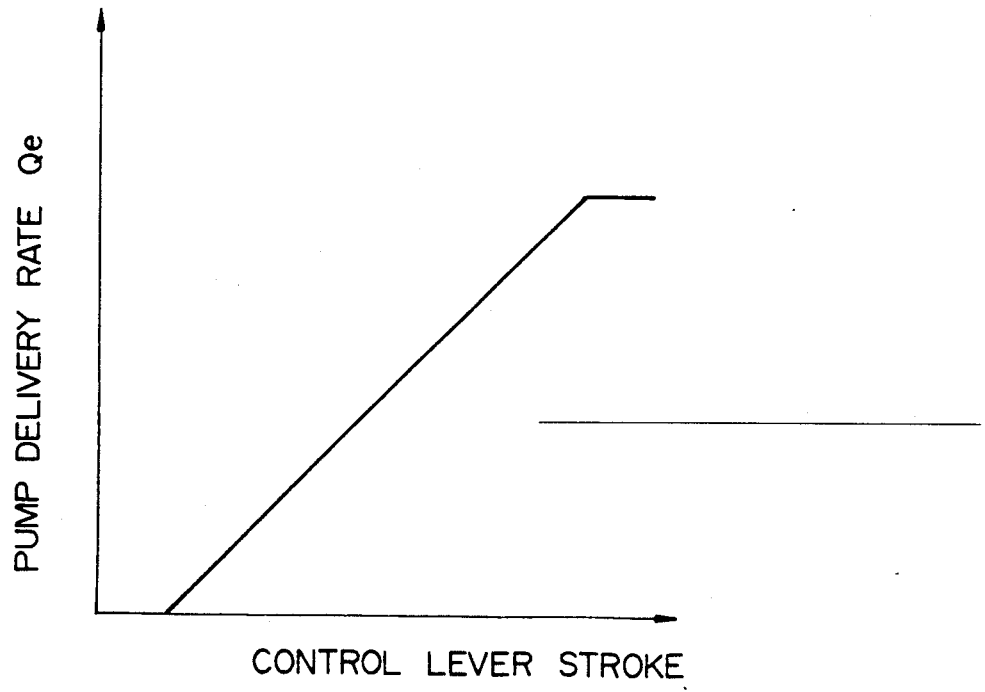
FIG. 29 is a graph showing the relationship between a control lever stroke and a pump delivery rate.
Figure 30:
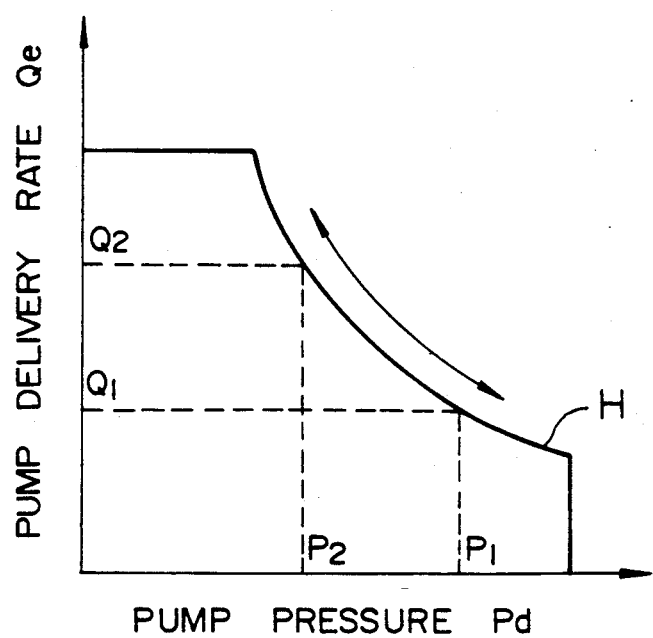
FIG. 30 is a graph showing the relationship between a pump delivery pressure and a pump delivery rate.

Operation of this embodiment will be described below with reference to FIGS. 28-30.

In this embodiment, capacity control of the hydraulic motor 1 is performed using the delivery rate Qe of the hydraulic pump 8. The relationship between the pump delivery rate Qe and the traveling speed v to be followed in the capacity control is shown in FIG. 28. Supposing that the pump delivery rate is initially above the second setting value Q2 when the delivery rate starts reducing, the capacity of the hydraulic motor 1 is set to the small capacity α1 at this time (steps 408-4–408-6 in FIG. 26) and the traveling speed v is reduced along a linear line having a slope determined by the small capacity α1. When the delivery rate falls below the second setting value Q2 and reaches the first setting value Q1, the motor capacity is shifted toward the large capacity α2 (steps 408-1–408-3 in FIG. 26). Afterward, the traveling speed is reduced along a linear line having a slope determined by the large capacity α2. On the contrary, when the pump delivery rate increases, the delivery rate is initially below the first setting value Q1 and the capacity of the hydraulic motor 1 is set to the large capacity α2 at this time (steps 408-1–408-3 in FIG. 26), so that the traveling speed v is increased along a linear line having a slope determined by the large capacity α2. When the delivery rate exceeds the first setting value Q1 and reaches the second setting value Q2, the motor capacity is shifted toward the small capacity α1. Afterward, the traveling speed is increased along a linear line having a slope determined by the small capacity α1 (steps 408-4–408-6 in FIG. 26).

With this embodiment, as described above, the motor capacity is shifted dependent on an increase and a decrease in the pump delivery rate, thereby to control the traveling speed.

Further, in this embodiment, the delivery rate of the hydraulic pump 8 is controlled by using the load sensing control. In the load sensing control, dependent on stroke changes of the control lever 11c associated with the flow control valve 11, the delivery rate of the hydraulic pump 8 is increased and decreased proportionally as shown in FIG. 29. Accordingly, while traveling under fine control, the control lever is operated in a small stroke and the pump delivery rate is reduced. At this time, when the delivery rate falls below the first setting value Q1, the hydraulic motor 1 is shifted toward the large capacity α2 and driven in the low-speed mode. Therefore, operability with fine control is improved. When the control lever is operated in a large stroke, aiming at traveling at a high speed, the pump delivery rate is also increased correspondingly. Upon the delivery rate exceeding the second setting value Q2, the hydraulic motor 1 is shifted toward the small capacity α2 and driven in the high-speed mode.

Moreover, in this embodiment, the horsepower limiting control is adopted for controlling the delivery rate of the hydraulic pump 8. Under the horsepower limiting control, when the second temporary target tilting angle θΔp becomes larger than the first temporary target tilting angle θT with a rise in the delivery pressure Pd of the hydraulic pump 8, the tilting angle of the hydraulic pump 8 is limited to the first temporary target tilting angle θT so that the delivery rate is reduced along a curve H shown in FIG. 30. As a result, traveling under two-speed control can be performed while automatically switching the capacity of the hydraulic motor 1.

More specifically, when the control lever is operated in a large stroke, aiming at traveling at a high speed on a flat road, the hydraulic motor 1 is shifted toward the small capacity α2 and driven in the high-speed mode as mentioned above. When the load pressure is increased upon coming into a sloped road to ascend, the hydraulic pump 8 is subjected to the horsepower limiting control and the pump delivery rate is reduced along the curve H in FIG. 30. When the delivery rate falls below the first setting value Q1, the hydraulic motor 1 is shifted toward the large capacity α2 and driven in the large-torque mode automatically. Upon entering a flat road again, the delivery rate is increased along the curve H and the hydraulic motor 1 is shifted to the small-capacity, high-speed mode on a condition of Qe≧Q2.

In this embodiment too, as described above, since the hydraulic motor is shifted in its capacity dependent on the traveling speed demanded while traveling on a flat road, it becomes possible to take a wide speed range from low speeds to high speeds even in a state of the small traveling load.

Further, since the first setting value Q1 and the second setting value Q2 compared with the delivery rate Qe in the motor capacity control are determined to meet the above-mentioned equation (1), the pump delivery rate will not reach or exceed the second setting value Q2 when the motor capacity is shifted from the small capacity α1 toward the large capacity α2, thereby keeping the motor capacity from being forced back from the large capacity α2 to small capacity α1 undesirably. This surely prevents hunting at the time of shifting.

It should be understood the actual tilting angle θ is used for calculating the pump delivery rate Qe in this embodiment, the target tilting angle θr may be used as with the first embodiment.

NINTH EMBODIMENT

A ninth embodiment of the present invention will be described with reference to FIG. 31. In this embodiment, a hydraulic pump of fixed displacement type is employed, a hydraulic pump of fixed displacement type is employed, an operation amount of the control lever associated with the flow control valve is used as a value for predicting the traveling speed, and a control block 600F is used in place of the control block 600 in the first embodiment.

Figure 31:
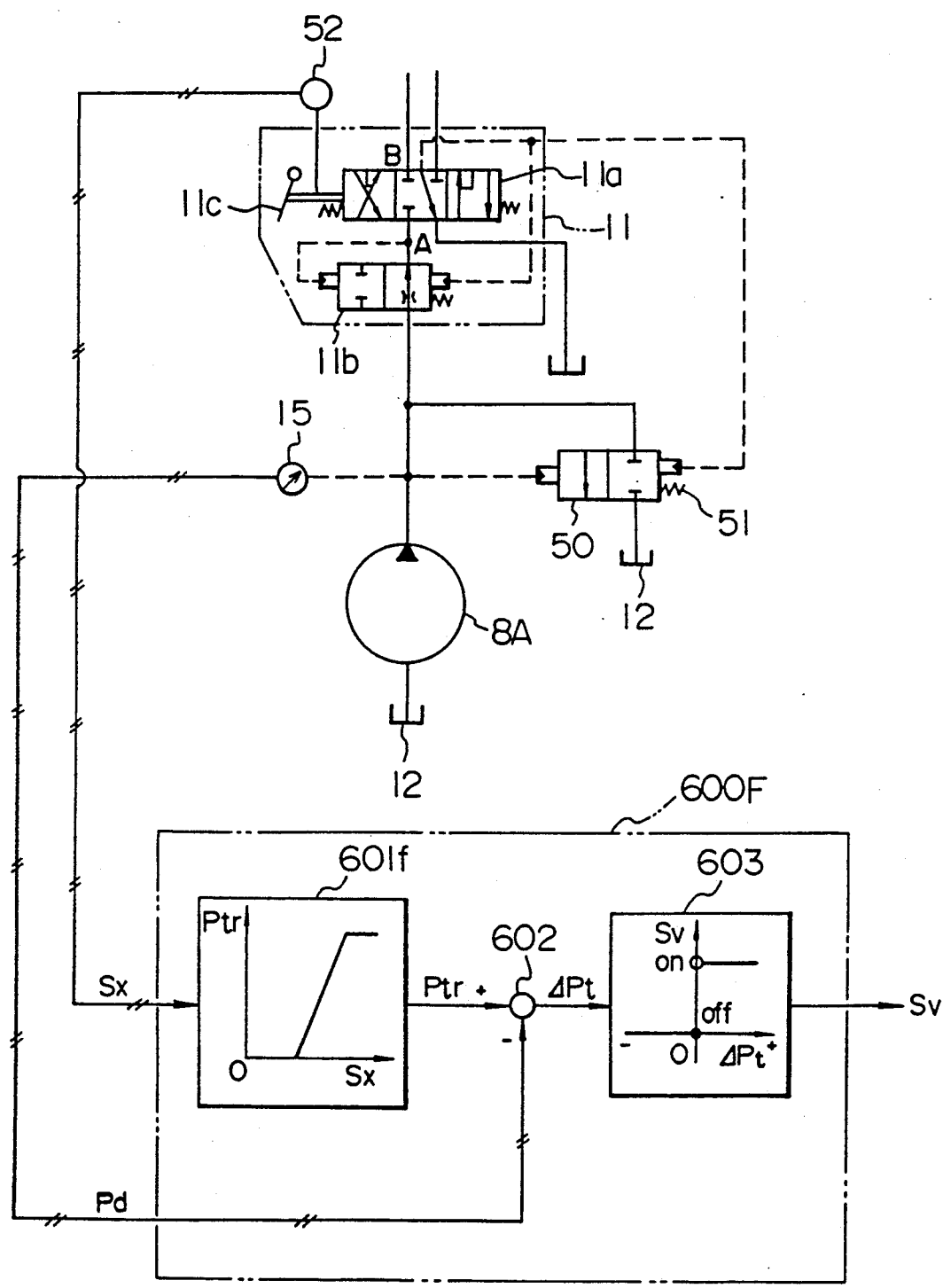
FIG. 31 is a schematic diagram of an important part of the hydraulic drive traveling system according to a ninth embodiment of the present invention.

In FIG. 31, a hydraulic pump 8A is of a fixed displacement pump, and an unload valve 50 driven dependent on a differential pressure ΔP between the pump delivery pressure Pd and the load pressure Pam of the hydraulic motor 1 is connected to a delivery line of the pump 8A. When the differential pressure ΔP exceeds a setting value of a spring 51, the unload valve 50 discharges the delivery flow rate to a tank 12 so that the differential pressure ΔP is held at the setting value. A control lever 11c of a flow control valve 11a is provided with a displacement gauge 52 which detects a stroke Sx of the control lever 11c, converts it to an electric signal, and outputs the electric signal to a controller, i.e., the control block 600F.

In a block 601f of the control block 600F, a shift decision pressure Ptr is calculated using the stroke Sx of the control lever 11c detected by the displacement gauge 52, instead of the target pump tilting $\theta r$.

In this embodiment, too, since the stroke Sx of the control lever 11c is dependent on the traveling speed demanded, the similar advantageous effects to that of the first embodiment can be provided.

INDUSTRIAL APPLICABILITY

According to the present invention, the hydraulic motor is controlled between the first capacity and the second capacity using a value associated with the traveling speed demanded, the hydraulic motor is shifted toward the large capacity even in a state of the small traveling load, when the low speed is demanded, with the result that fine control can easily be made and a wide speed range from low speeds to high speeds can be achieved. Further, by changing the shift decision value dependent on the traveling speed demanded, it is possible to set the shift decision value optimum for speeds ranging from a low level to a high level, and to make a shift in speed under an optimum load state at any levels of speed. In addition, by providing at least one of a delay time, a hysteresis characteristic and a dead time, it is also possible to achieve such control that the motor tilting will not be shifted repetitively with temporary fluctuations in the pump delivery pressure produced upon shift of the motor tilting, and hunting becomes less likely to occur.

What is claimed is:

1. A hydraulic drive traveling system for construction vehicles comprising a hydraulic pump, at least one hydraulic motor of variable displacement type driven by a hydraulic fluid delivered from said hydraulic pump, a pressure compensated flow control valve connected between said hydraulic motor dependent on an operation amount of control means, and motor control means for shifting said hydraulic motor between a first capacity and a second capacity smaller than the first capacity, wherein:

said motor control means includes first means for detecting a value ($\theta r$) associated with a traveling speed demanded for said hydraulic motor, and second means for controlling said hydraulic motor between the first capacity and the second capacity by using said value whereby when a delivery pressure of the pump is at a predetermined high level, said hydraulic motor is shifted to the first capacity; when the delivery pressure of the pump is lower than said predetermined level and said demanded traveling speed is at a predetermined high speed, the hydraulic motor is shifted to the second capacity; and when the delivery pressure of the pump is lower than said predetermined level and said demanded traveling speed is lower than said predetermined speed, the hydraulic motor is shifted to the first capacity.

2. A hydraulic drive traveling system according to claim 1, wherein said system further comprises pump control means for controlling a delivery capacity of said hydraulic pump dependent on the operation amount of said control means, and said first means detects a value ($\theta r$; $\theta$; Qe) associated with the delivery rate of said hydraulic pump as said value associated with the traveling speed demanded.

3. A hydraulic drive traveling system according to claim 2, wherein said first means detects a delivery capacity ($\theta r$; $\theta$) of said hydraulic pump as said value associated with the delivery rate of said hydraulic pump.

4. A hydraulic drive traveling system according to claim 3, wherein said pump control means includes means for calculating a target delivery capacity ($\theta r$) to hold constant a differential pressure between the delivery pressure of said hydraulic pump and the load pressure of said hydraulic pump, and means for controlling the delivery capacity of said hydraulic pump to be coincident with said target delivery capacity, wherein said first means detects said target delivery capacity ($\theta r$) as said delivery capacity of said hydraulic pump.

5. A hydraulic drive traveling system according to claim 3, wherein said first means detects an actual delivery capacity ($\theta$) of said hydraulic pump as said delivery capacity of said hydraulic pump.

6. A hydraulic drive traveling system according to claim 1, wherein said second means includes means for detecting a delivery pressure (Pd) of said hydraulic pump, means for calculating a shift decision value (Ptr) for the capacity of said hydraulic motor from said value ($\theta r$) associated with the traveling speed demanded, and means for comparing the delivery pressure of said hydraulic pump with the shift decision value, and controlling said hydraulic motor to have said first capacity when the delivery pressure is larger than the shift decision value, and to have said second capacity when the delivery pressure is smaller than the shift decision value.

7. A hydraulic drive traveling system according to claim 6, wherein said means for calculating the shift decision value (Ptr) sets the relationship between said value ($\theta r$) associated with the traveling speed demanded and the shift decision value such that the shift decision value is small in a range where said value associated with the traveling speed demanded is small, and becomes larger as said value associated with the traveling speed demanded is increased.

8. A hydraulic drive traveling system according to claim 1, wherein said second means includes means for detecting a delivery pressure (Pd) of said hydraulic pump, means for calculating a shift decision value ($\theta tr$) for the capacity of said hydraulic motor from said delivery pressure, and means for comparing said value ($\theta r$) associated with the traveling speed demanded with the shift decision value, and controlling said hydraulic motor to have said first capacity when said value associated with the traveling speed demanded is smaller than the shift decision value, and to have said second capacity when said value associated with the traveling speed demanded is larger than the shift decision value.

9. A hydraulic drive traveling system according to claim 8, wherein said means for calculating the shift decision value ($\theta tr$) sets the relationship between the delivery pressure (Pd) and the shift decision value such that the shift decision value is small in a range wherein the delivery pressure is small, and becomes larger as the delivery pressure is increased.

10. A hydraulic drive traveling system according to claim 1, wherein said system further comprises pump control means for controlling a delivery rate of said hydraulic pump such that the delivery rate of said hydraulic pump is increased with an increase in said demanded traveling speed while a maximum value of the delivery rate of said hydraulic pump is reduced with a rise in the delivery pressure of the pump when the delivery pressure exceeds a predetermined value; wherein said first means detects a value associated with the delivery rate of said hydraulic pump as said value associated with the demanded traveling speed; and wherein said second means includes means for setting a shift decision value (Q1, Q2) for the capacity of said hydraulic motor in advance, and means for comparing said value (Qe) associated with the delivery rate of said hydraulic pump with the shift decision value, and controlling said hydraulic motor to have said first capacity when said value associated with the delivery rate of said hydraulic pump is smaller than the shift decision value, and to have said second capacity when said value associated with the delivery rate of said hydraulic pump is larger than the shift decision value.

11. A hydraulic drive traveling system according to claim 1, wherein said second means includes means for detecting a delivery pressure (Pd) of said hydraulic pump, means for calculating a first shift decision value (Ptrl) and a second shift decision value (Ptr2) larger than the first shift decision value from said value ($\theta r$) associated with the traveling speed demanded, and means for comparing the delivery pressure of said hydraulic pump with the first and second shift decision values, and controlling said hydraulic motor to have said first capacity when the delivery pressure is larger than the second shift decision value, to have said second capacity when the delivery pressure is smaller than the first shift decision value, and to maintain the motor capacity at that time when the delivery pressure is between the first shift decision value and the second shift decision value.

12. A hydraulic drive traveling system according to claim 1, wherein said second means includes means for detecting a delivery pressure (Pd) of said hydraulic pump, means for calculating a first shift decision value ($\theta trl$) and a second shift decision value ($\theta tr2$) larger than the first shift decision value from the delivery pressure, and means for comparing said value ($\theta r$) associated with the traveling speed demanded with the first and second shift decision values, and controlling said hydraulic motor to have said first capacity when said value associated with the traveling speed demanded is smaller than the first shift decision value, to have said second capacity when said value associated with the traveling speed demanded is larger than the second shift decision value, and to maintain the motor capacity at that time when said value associated with the traveling speed demanded is between the first shift decision value and the second shift decision value.

13. A hydraulic drive traveling system according to claim 1, wherein said system further comprises pump control means for controlling a delivery rate of said hydraulic pump such that the delivery rate of said hydraulic pump is increased with an increase in said demanded traveling speed while a maximum value of the delivery rate of said hydraulic pump is reduced with a rise in the delivery pressure of the pump when the delivery pressure exceeds a predetermined value; wherein said first means detects a value associated with the delivery rate of said hydraulic pump as said value associated with the demanded traveling speed; and wherein said second means includes means for setting a first shift decision value (Q1) and a second shift decision value (Q2) larger than the first shift decision value in advance, and means for comparing said value (Qe) associated with the delivery rate of said hydraulic pump with the first and second shift decision values, and controlling said hydraulic motor to have said first capacity when said value associated with the delivery rate of said hydraulic pump is smaller than the first shift decision value, to have said second capacity when said value associated with the delivery rate of said hydraulic pump is larger than the second shift decision value, and to maintain the motor capacity at that time when said value associated with the delivery rate of said hydraulic pump is between the first shift decision value and the second shift decision value.

14. A hydraulic drive traveling system according to claim 6, wherein said second means further includes means for delaying shift in the capacity of said hydraulic motor by a certain period of time when the result of comparison with said shift decision value (Ptr) is changed.

15. A hydraulic drive traveling system according to claim 6, wherein said second means further includes means for keeping the motor capacity shifted until elapse of a certain period of time after shifting the capacity of said hydraulic motor, even when the result of comparison with said shift decision value (Ptr) is changed.

16. A hydraulic drive traveling system according to claim 8, wherein said second means (600A) further includes means (604) for delaying shift in the capacity of said hydraulic motor (1) by a certain period of time when the result of comparison with said shift decision value (Ptr) is changed.

17. A hydraulic drive traveling system according to claim 10, wherein said second means (600A) further includes means (604) for delaying shift in the capacity of said hydraulic motor (1) by a certain period of time when the result of comparison with said shift decision value (Ptr) is changed.

18. A hydraulic drive traveling system according to claim 8, wherein said second means further includes means (700) for keeping the motor capacity shifted until elapse of a certain period of time after shifting the capacity of said hydraulic motor (1), even when the result of comparison with said shift decision value (Ptr) is changed.

19. A hydraulic drive traveling system according to claim 10, wherein said second means further includes means (700) for keeping the motor capacity shifted until elapse of a certain period of time after shifting the capacity of said hydraulic motor (1), even when the result of comparison with said shift decision value (Ptr) is changed.

20. A hydraulic drive traveling system for construction vehicles comprising a hydraulic pump, at least one hydraulic motor of variable displacement type driven by a hydraulic fluid delivered from said hydraulic pump, a pressure compensated flow control valve connected between said hydraulic pump and said hydraulic motor for controlling a flow rate of the hydraulic fluid supplied to said hydraulic motor dependent on an operation amount of control means, pump control means for controlling a delivery rate of said hydraulic pump such that the delivery rate of said hydraulic pump is increased with an increase in the flow rate demanded by said flow control valve, and motor control means for shifting said hydraulic motor based on a shift decision value between a first capacity and a second capacity smaller than the first capacity, wherein:

said motor control means includes first detection means for detecting the flow rate demanded by said flow control valve, second detection means for detecting a delivery pressure of said hydraulic pump, computing means in which a function of said flow rate demanded by the flow control valve and said shift decision value in which the shift decision value increases with an increase in the demanded flow rate is set in advance for determining a corresponding decision value based on the demanded flow rate detected by said first detection means, and means for comparing the delivery pressure detected by said second detection means with the shift decision value determined by said computing means and controlling said hydraulic motor to have said first capacity when said delivery pressure is larger than the shift decision value and to have said second capacity when the delivery pressure is smaller than the shift decision value.

21. A hydraulic drive traveling system for construction vehicles comprising a hydraulic pump, at least one hydraulic motor of variable displacement type driven by a hydraulic fluid delivered from said hydraulic pump, a pressure compensated flow control valve connected between said hydraulic pump and said hydraulic motor for controlling a flow rate of the hydraulic fluid supplied to said hydraulic motor dependent on an operation amount of control means, pump control means for controlling a delivery rate of said hydraulic pump such that the delivery rate of said hydraulic pump is increased with an increase in the flow rate demanded by said flow control valve, and motor control means for shifting said hydraulic motor based on a shift decision value between a first capacity and a second capacity smaller than the first capacity, wherein:

said motor control means includes first detection means for detecting the flow rate demanded by said flow control valve, a second detection means for detecting a delivery pressure of said hydraulic pump, computing means in which a function of said delivery pressure of the hydraulic pump and said shift decision value in which the shift decision value increases with an increase in the pump delivery pressure is set in advance for determining a corresponding decision value based on the pump delivery pressure detected by said second detection means, and means for comparing the flow rate demanded by said flow control valve detected by said first detection means with the shift decision value determined by said computing means and controlling said hydraulic motor to have said first capacity when said demanded flow rate is smaller than the shift decision value and to have said second capacity when the demanded flow rate is larger than the shift decision value.

* * * * *